United States Patent
Buckley et al.

(10) Patent No.: US 11,657,474 B1
(45) Date of Patent: May 23, 2023

(54) DISPLAY NON-UNIFORMITY CORRECTION

(71) Applicant: META PLATFORMS TECHNOLOGIES, LLC, Menlo Park, CA (US)

(72) Inventors: Edward Buckley, Redmond, WA (US); Bennett Sampson Wilburn, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/581,816

(22) Filed: Jan. 21, 2022

(51) Int. Cl.
*G06T 3/00* (2006.01)
*G02B 27/01* (2006.01)
*G06F 3/04847* (2022.01)
*G06F 3/01* (2006.01)

(52) U.S. Cl.
CPC ........ *G06T 3/0056* (2013.01); *G02B 27/0172* (2013.01); *G06F 3/013* (2013.01); *G06F 3/04847* (2013.01)

(58) Field of Classification Search
CPC ... G06T 3/0056; G02B 27/0172; G06F 3/013; G06F 3/04847
See application file for complete search history.

(56) References Cited

U.S. PATENT DOCUMENTS

| | | | | |
|---|---|---|---|---|
| 9,214,013 B2* | 12/2015 | Venkataraman | ........ | G06T 5/002 |
| 10,636,116 B1* | 4/2020 | Gotsch | ................. | H04N 13/307 |
| 2007/0024614 A1* | 2/2007 | Tam | ...................... | H04N 13/282 |
| | | | | 348/E13.02 |
| 2016/0260258 A1* | 9/2016 | Lo | ....................... | G02B 27/0172 |
| 2017/0124928 A1* | 5/2017 | Edwin | ...................... | G06F 3/013 |
| 2017/0353717 A1* | 12/2017 | Zhou | ..................... | H04N 13/398 |
| 2018/0184075 A1* | 6/2018 | Park | ..................... | H04N 13/305 |
| 2019/0222830 A1* | 7/2019 | Edwin | ................. | G06F 3/04815 |
| 2020/0126180 A1* | 4/2020 | Gotsch | ................. | H04N 13/307 |
| 2021/0302756 A1* | 9/2021 | Makinen | ................ | G02B 30/31 |

OTHER PUBLICATIONS

Kress B.C., et al., "Waveguide Combiners for Mixed Reality Headsets: A Nanophotonics Design Perspective," Nanophotonics, 2021, vol. 10, No. 1, pp. 41-74.

* cited by examiner

*Primary Examiner* — Mihir K Rayan
(74) *Attorney, Agent, or Firm* — Baker Botts L.L.P.

(57) ABSTRACT

In one embodiment, the system may determine an estimated distance of an eye of a user to a display plane of a display. The system may access, from a memory storage, a number of transmission maps characterizing non-uniform transmission characters of the display as measured from a number of pre-determined view positions within a measurement plane. The measurement plane may be separated from the display plane by a known distance. The system may generate a custom transmission map for the estimated distance of the eye based on the transmission maps using light field rendering. The system may determine a custom correction map based on the custom transmission map. The system may adjust an image to be displayed on the display using the custom correction map. The system may display the image adjusted using the custom correction map on the display.

20 Claims, 16 Drawing Sheets

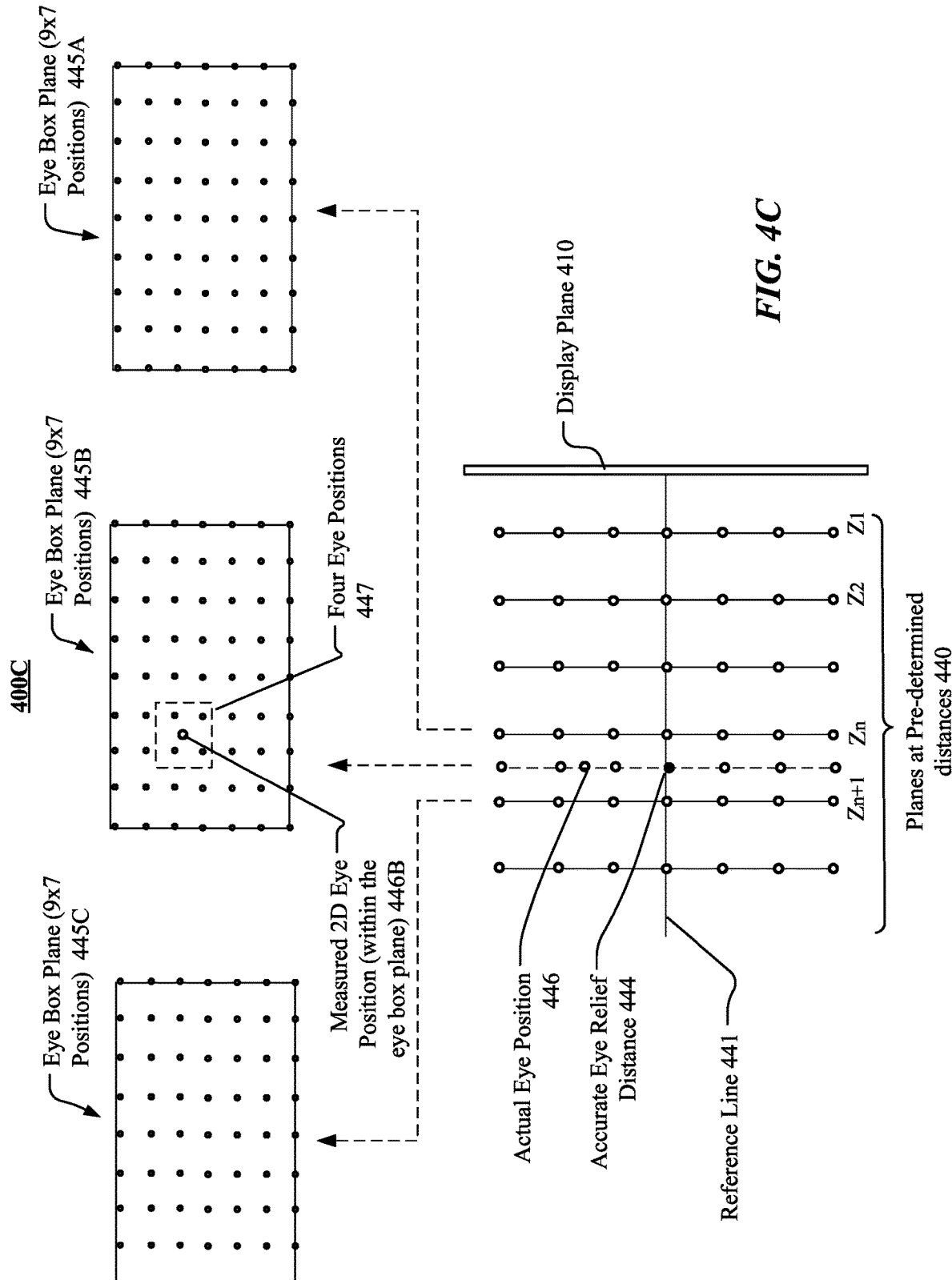

DISPLAY NON-UNIFORMITY CORRECTION

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for generating custom correction maps for correcting display non-uniformity according to the user's current eye position. In particular embodiments, the system may an in-factory or in-store calibration process to generate a number of pre-generated correction maps that are at the user's eye relief distance and are parameterized to the user's eye pupil position (X, Y) at that eye relief distance. For example, the system may use a high-resolution eye tracking or measuring system (e.g., at the headset factory or store calibration process) to determine an accurate eye relief distance (e.g., Z distance) between the user's pupil and the waveguide. Then, the system may generate a number of pre-generated correction maps at the user's eye relief distance at a number of pre-defined (X, Y) positions by measuring the waveguide transmission maps at these positions on the user's eye relief plane. The system may store these pre-generated correction maps in memory storage for later use of generating corresponding custom correction maps at run-time. At run time, the system may use an eye tracking system to determine the user's eye pupil position (X, Y, Z). The system may discard the z distance and use the (X, Y) positions to generate the custom correction maps for the user by interpolating the pre-generated correction maps based on the (X, Y) position of the user's eye. This embodiment may generate accurate corrections map but could be relatively expensive since each user's eye relief distance need to be measured by in the factory or store calibration process. This embodiment may assume the user's eye relief will not change after the user puts on the headset.

In particular embodiments, the AR/VR device may use an on-device calibration process to generate the custom correction maps for the user's eye relief distance. The on-device calibration process may be a two-step process or a one-step process. For the two-step process, at a high level, the system may pre-generate and store a number of pre-generated correction maps in the memory storage. These pre-generated correction maps may be parameterized to the user's eye position (X, Y) at the user's eye relief distance. These pre-generated correction maps may be generated by actually measuring the corresponding waveguide transmission maps at multiple eye relief distances (e.g., at a number of pre-determined positions for each eye relief distance). Alternatively, these pre-generated correction maps may be generated by actually measuring the waveguide transmission maps at one eye relief distance and using ray optics to generate these pre-generated correction maps that are parameterized for pupil (X, Y) positions at the user's eye relief distance. It is notable that the correction maps that are generated using ray optics based on the initial pre-generated correction map may be referred to as "intermediate correction maps." At run time, the system may use the eye tracking system to determine the user's eye pupil position (X, Y, Z) and use the (X, Y) position (discarding the z information) to generate the custom correction maps. The custom correction maps may be generated by interpolating the corresponding intermediate correction maps (e.g., four correction maps corresponding to four pre-determined positions containing the (X, Y) position). In particular embodiments, the system may use a one-step process to determine the custom correction maps based on the (X, Y, Z) pupil position of the user. The system may use the ray optics to directly determine the custom correction maps for the users based on the initial pre-generated correction maps or/and transmission maps corresponding to one eye relief distance.

In particular embodiments, for the on-device calibration process using the two-step process, the system may measure the waveguide transmission maps at multiple eye relief distances (at a number of pre-determined positions for each eye relief distance) and generate the corresponding pre-generated correction maps based on these measurements. As a result, the system may generate a matrix of pre-generated correction maps including an array of pre-generated correction maps for each eye relief distance. The system may store these pre-generated correction maps in memory storage for run-time use. At run time, the system may first determine a rough eye relief distance Z using the eye tracking system of the AR/VR device and determine custom correction maps corresponding to the rough eye relief distance Z. Then, the system may allow the user to provide feedback information (e.g., using a sliding bar on the user interface, using a controller, using an voice input, etc.) to guide the system to generate an optimal custom correction map that would yield optimal non-uniformity correction maps that can better correct the display's non-uniformity. For example, the system may access the pre-generated correction maps at pre-determined integral eye relief distances $Z_1, Z_2, Z_3$, etc. Then, during the on-device calibration process, the system may use the eye tracker to provide a coarse estimation of the $Z_i$ distance of the user's eye relief distance. The system may select the pre-generated correction maps at $Z_n$ and $Z_{n+1}$ from the pre-determined maps based on the $Z_i$ distance determined by the eye tracker in response to a determination that $Z_i$ is between the positions corresponding to $Z_n$ and $Z_{n+1}$. The system may interpolate these two sets of pre-generated correction maps corresponding to $Z_n$ and $Z_{+1}$ to determine the set of intermediate correction maps for $Z_i$ (which are parameterized for pupil (X, Y)). The set of intermediate correction maps at $Z_i$ may be used to generate the custom correction maps based on the (X, Y) pupil position (e.g., by interpolating the four intermediate correction maps corresponding to the four positions containing the (X, Y) position). The custom correction maps may be used to correct the display non-uniformity when the user's eye is at distance $Z_i$ with at any (X, Y) position (e.g., with the eye box). These custom correction maps for the distance $Z_i$ may be used to correct an image which is displayed to the user via the display (e.g., through the waveguide) when the user's eye pupil is at the corresponding (X, Y) positions at distance $Z_i$. The user may observe whether the custom correction map adequately corrected for the display non-uniformities. Then, the system may provide the user a virtual slider to allow the user to provide real-time feedback on the display quality and specify a simulated $Z_j$ distance for the user would like to try (e.g., with the range between $Z_n$, and $Z_{n+1}$ as controlled by the slide bar). While the user is adjusting the virtual slider, the system may constantly regenerate the parameterized intermediate correction maps at $Z_i$ and the custom correction maps in real-time for the user until the user sees an optimal display result. In particular embodiments, this process may be repeated for each of the 9×7 eye box positions. In particular embodiments, the system may repeat this process only for a subset of positions of the 9×7 eye box positions. In particular embodiments, the system may only calibrate the center position and corner positions of the eye box and may use the optimal Z values to determine a 3D surface fit for the custom correction map. In particular embodiments, this on-device calibration process may be based on directly interpolating pre-generated correction maps. In particular embodiments, this online calibration process may be based on interpolating pre-determined transmission maps at the pre-determined distances instead of the correction maps.

In particular embodiments, the system may use a one-step process to directly generate custom correction maps for correcting the display's non-uniformity using ray optics based on light field rendering principle. For example, the system may use a propagation method to determine custom correction maps for correcting the display's non-uniformity according to the user's eye position based on pre-determined calibration data (e.g., transmission maps) at one eye relief distance (e.g., a nominal distance). The system may pre-measure the waveguide transmission maps at a number of pre-determined eye positions on a plane corresponding to a nominal eye relief. This pre-measurement may be done during the manufactory calibration process before shipping the product (because it does need user's actual eye relief information). The system may store these pre-measured transmission maps in a memory storage for later use.

As an example and not by way of limitation, at run time, the system may first determine the user's eye position (X, Y, Z) in the 3D space including the eye relief distance (e.g., using an eye tracking system). Then, the system may use the propagation method (e.g., a ray tracing method) to determine a waveguide transmission map for the user's current eye position. The propagation method may include casting a number of rays from the user's eye position to a display plane of the waveguide. Some rays may pass through the view positions that are used to capture the pre-captured transmission maps. Some rays may fall between a group of view positions (e.g., four view positions) that are used to capture the pre-measured transmission maps. The system may determine the transmission map for the user's current eye position by sampling the light field as represented by pre-measured transmission maps. For example, for a ray passing through a pre-determined view position, the corresponding light intensity (and thus the display non-uniformity characters) along that direction should be the same in the current transmission map and the pre-measured transmission map corresponding to that view position. In other words, the system may determine the light intensity (and thus, the display non-uniformity characters) along this direction based on information (light intensity and display non-uniformity characters of the same direction) in the pre-captured transmission maps. As another example, for a ray falling between four pre-determined view positions, the system may use a bilinear interpolation process to determine the light intensity (and display transmission characters, display non-uniformity characters) along that ray direction base on the four light intensities (and transmission characters) of the same direction at the first pre-determined view positions. As such, the system may determine a current transmission map for the current eye position based on the four pre-measured transmission maps. The current transmission map may accurately describe the non-uniformity characteristics of the waveguide for the current eye position. Then, the system may generate a custom correction map based on the current transmission map and use the custom correction map to compensate the pixel values of the image to be displayed before outputting these pixel values to the display.

As another example and not by way of limitation, the system may use a set of pre-measured transmission maps at a nominal distance Z to determine the current transmission map (e.g., using the ray optics method based on the light field rendering principle) for a candidate $Z_j$ distance (e.g., as specified by the user's slide bar) without using the eye tracking system. The set of pre-measured transmission maps for Z may be associated with several (X, Y) positions, similar to a light field (e.g., there may be an array of 10×10 pre-measured transmission maps corresponding to an array of 10×10 (X, Y) locations). The system may display to the user a virtual slider (with or without using the eye tracking data to determine the eye position) to specify a candidate $Z_j$ distance. Based on the presumed user's (X, Y) view position, the system could use the pre-captured transmission maps at the nominal distance Z to generate a synthesized transmission map for (X, Y, $Z_j$) using ray optics based on light field rendering principle. The synthesized transmission map for (X, Y, $Z_j$) may be used to generate a custom correction map for (X, Y, $Z_j$), which in turn is used to correct the test image. The system may first infer the user's eye position to provide a starting point. Then, the system may adjust the inferred eye position based on the user's feedback and constantly update the transmission map and custom correction map in real-time (for different Z distances and different (X, Y) view positions), until the user see an optimal display content. As a result, the display non-uniformity may be effectively corrected, and the system may only need to store the pre-measured data corresponding to a single eye relief distance. In particular embodiments, the system may assume the user's eye relief will not change and may only re-generate the custom correction map in response to the user's eye position change in the 2D plane. In particular embodiments, the system may assume the user's eye position may change in the 3D space (including eye relief) and may re-generate the custom correction map response to the user's eye position change in the 3D space.

In particular embodiments, the system may display to the user a virtual slider that affects a forward or backward propagation of a compressed set of basis vectors (corresponding to waveguide correction maps from the nominal position) to determine the custom correction map for the user's current eye position. The system may determine the principle factors and coefficients (e.g., in basis vectors) that can represent the pre-generated correction maps at particular eye relief distance(s) and perform interpolation on these factors and coefficients in the Z direction to determine the intermediate correction maps that are parameterized for (X, Y) pupil positions at a target eye relief distance. The system may repeat this process for each of the 9×7 eye box positions or for a subset of those eye box positions. The intermediate correction maps that are parameterized for (X, Y) pupil positions may be used to generate the custom correction maps based on the actual (X, Y) pupil positions as tracked by the eye tracking system using interpolation. Alternatively, the system may perform interpolation on these factors and coefficients to directly generate the custom correction map based on the (X, Y, Z) pupil position of the user. The system may first convert the waveguide maps (e.g., transmission maps or correction maps) in the RGB space to the RCbCr space and use the basis vectors including these factors and coefficients to represent the correction maps in a compressed form in the YCbCr space. Then, the system may perform the interpolation on the basis vectors to determine the final correction maps and convert them back to the RGB space. The system may constantly update the custom correction map in real-time while the user is adjusting the virtual slider until the user sees an optimal display result.

In particular embodiments, the system may generate a set of pre-generated correction maps for a fixed Z distance for each user, which is useful when there is significant uncertainty in measuring Z. The system may assume the user's eye relief will not change once the user put on the headset. In some other embodiments, the system may assume the user's eye position can change in the 3D space (including the eye relief distance). The system may use real-time eye tracking to determine the user's eye position in the 3D space (in such embodiments, the eye tracking system may be capable of measuring the user's Z distance sufficiently accurately) and use the interpolation approach or ray optics based on the light field rendering principle to determine, for each frame, a separate custom correction maps based on the 3D eye position of the user. In other words, the system may not have an explicit calibration phase and may not need to generate a calibration map that is specific to a certain eye position. Instead, the system may work from the original data and for each frame, to compute a separate custom correction map for each frame based on the current 3D eye position of the user. This embodiment may generate the most accurate custom correction map but may be relatively expensive in terms of computational and memory usage.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4C illustrates an example process for determining a set of correction maps for an array of positions within the eye box.

DESCRIPTION OF EXAMPLE EMBODIMENTS

Figure 1A:
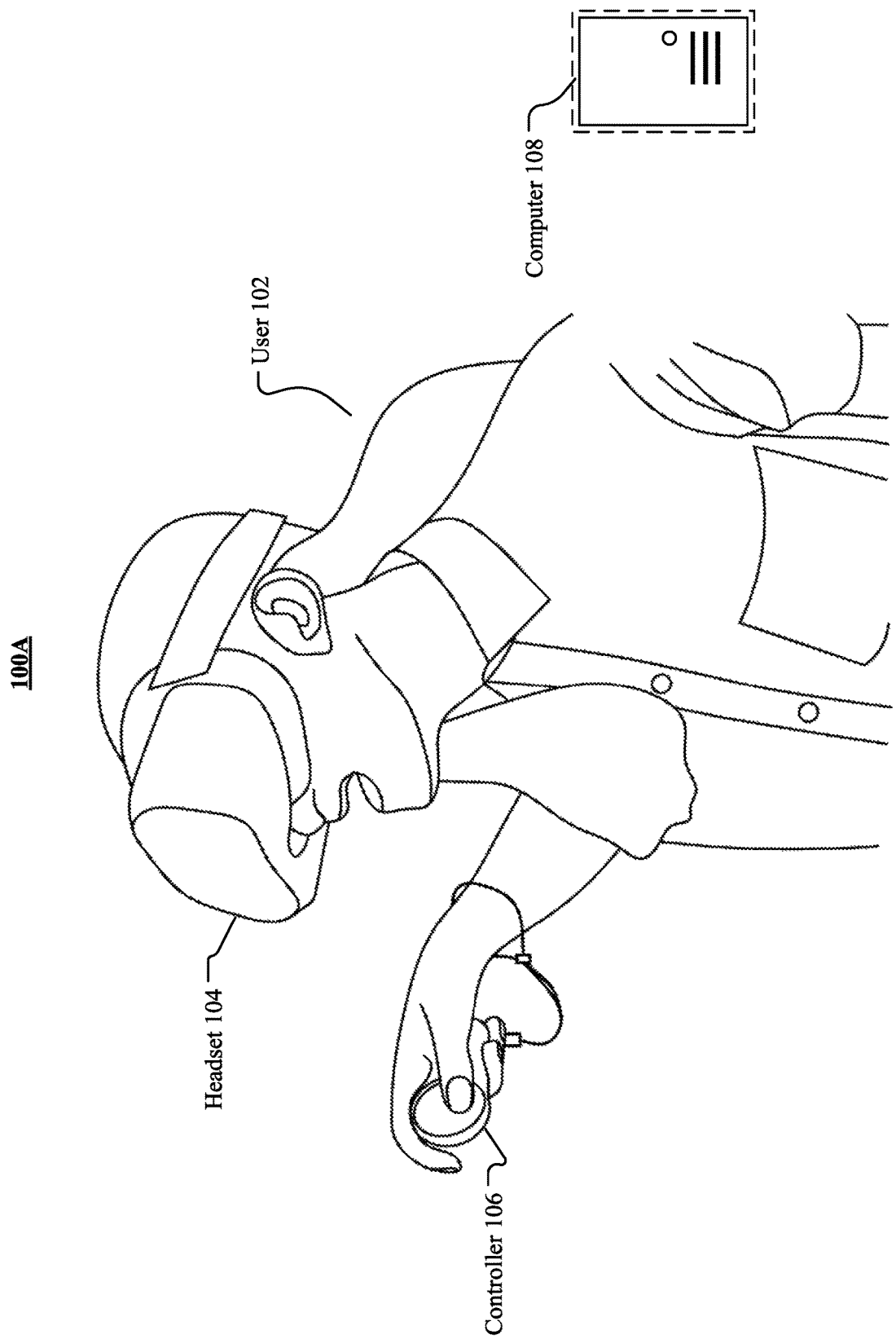
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
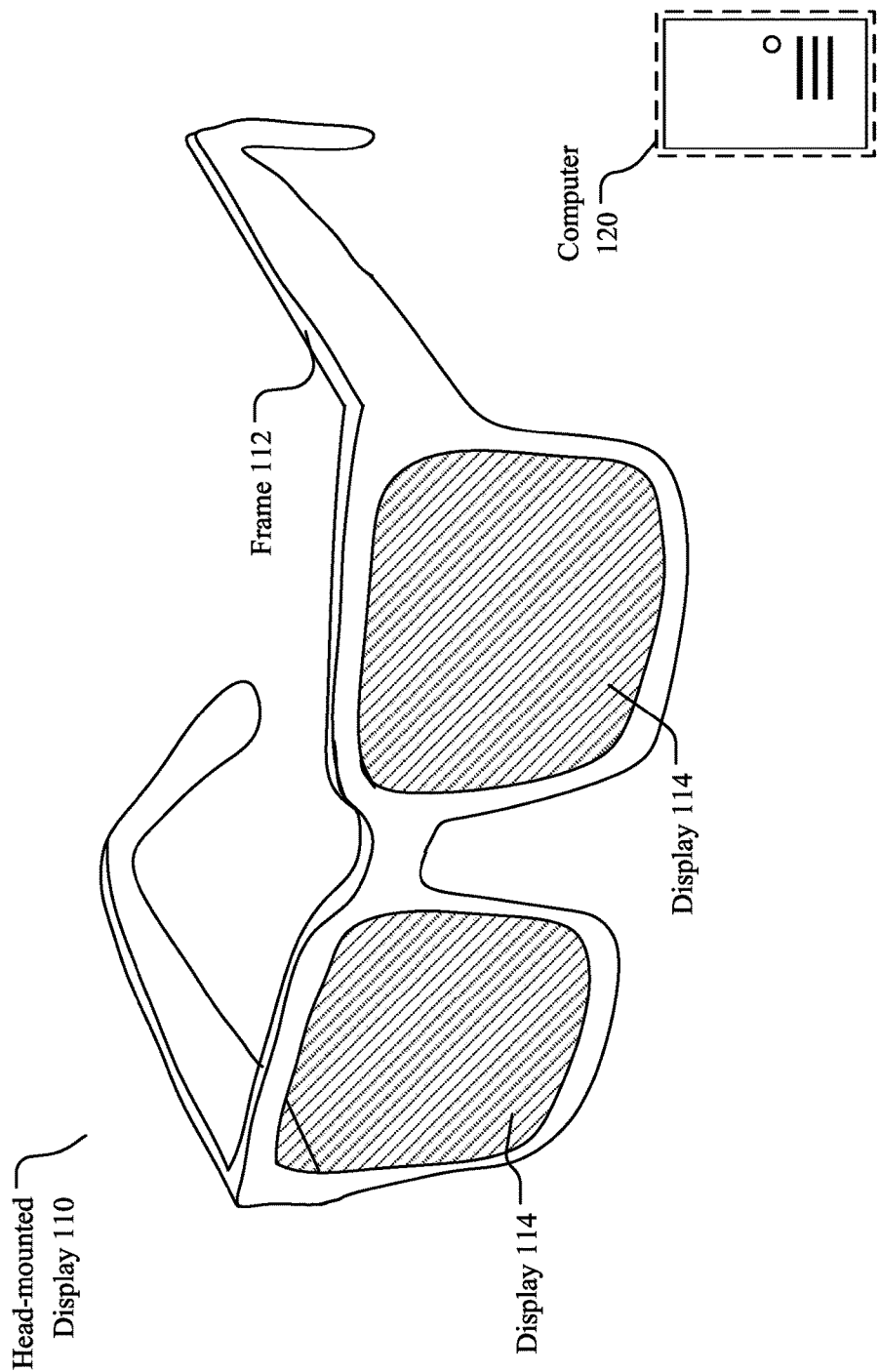
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
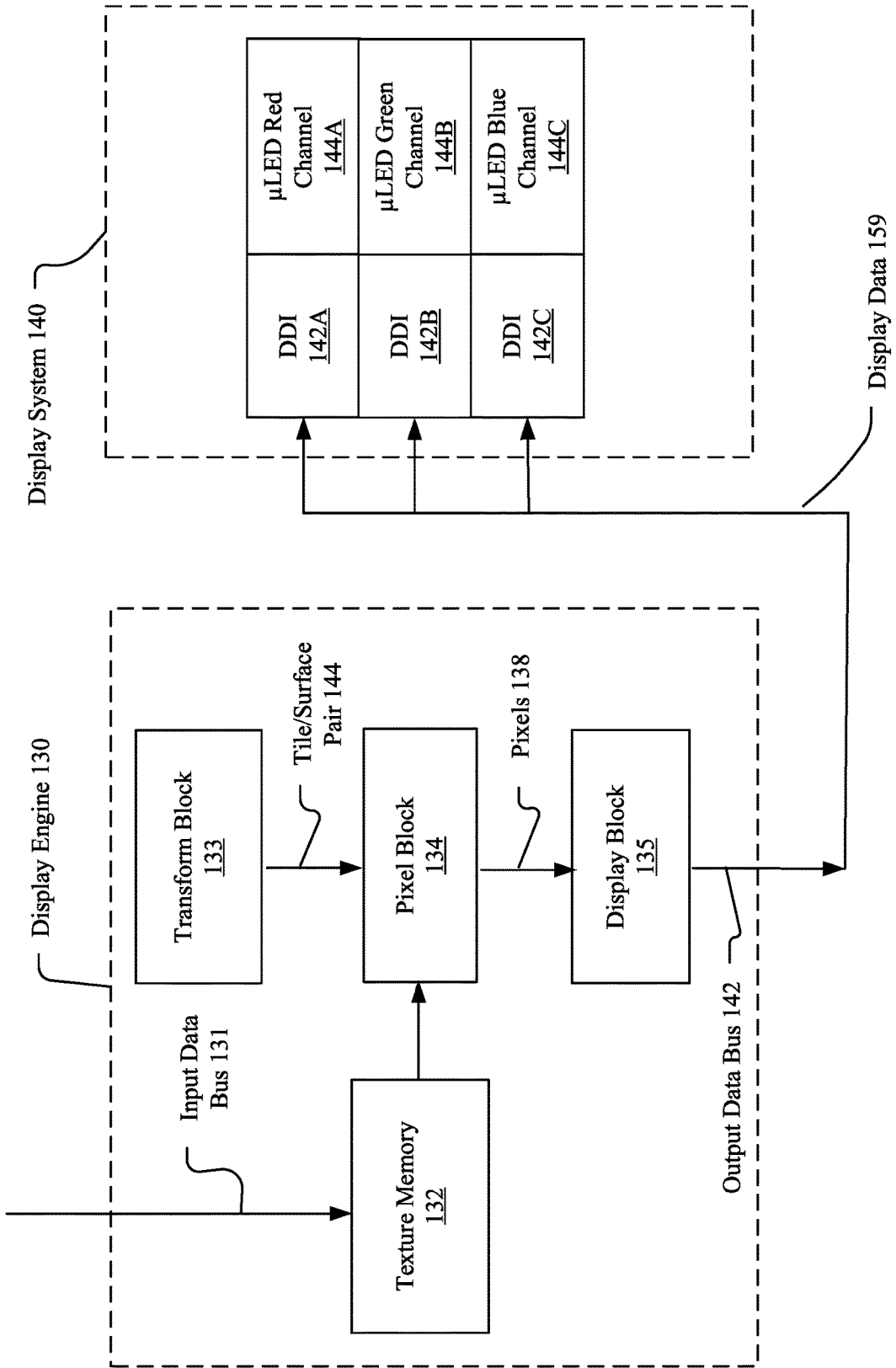
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a view position or view angle of the user as measured by one or more eye tracking sensors. The mainframe image may be generated or/and loaded into the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current view position of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current view position (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
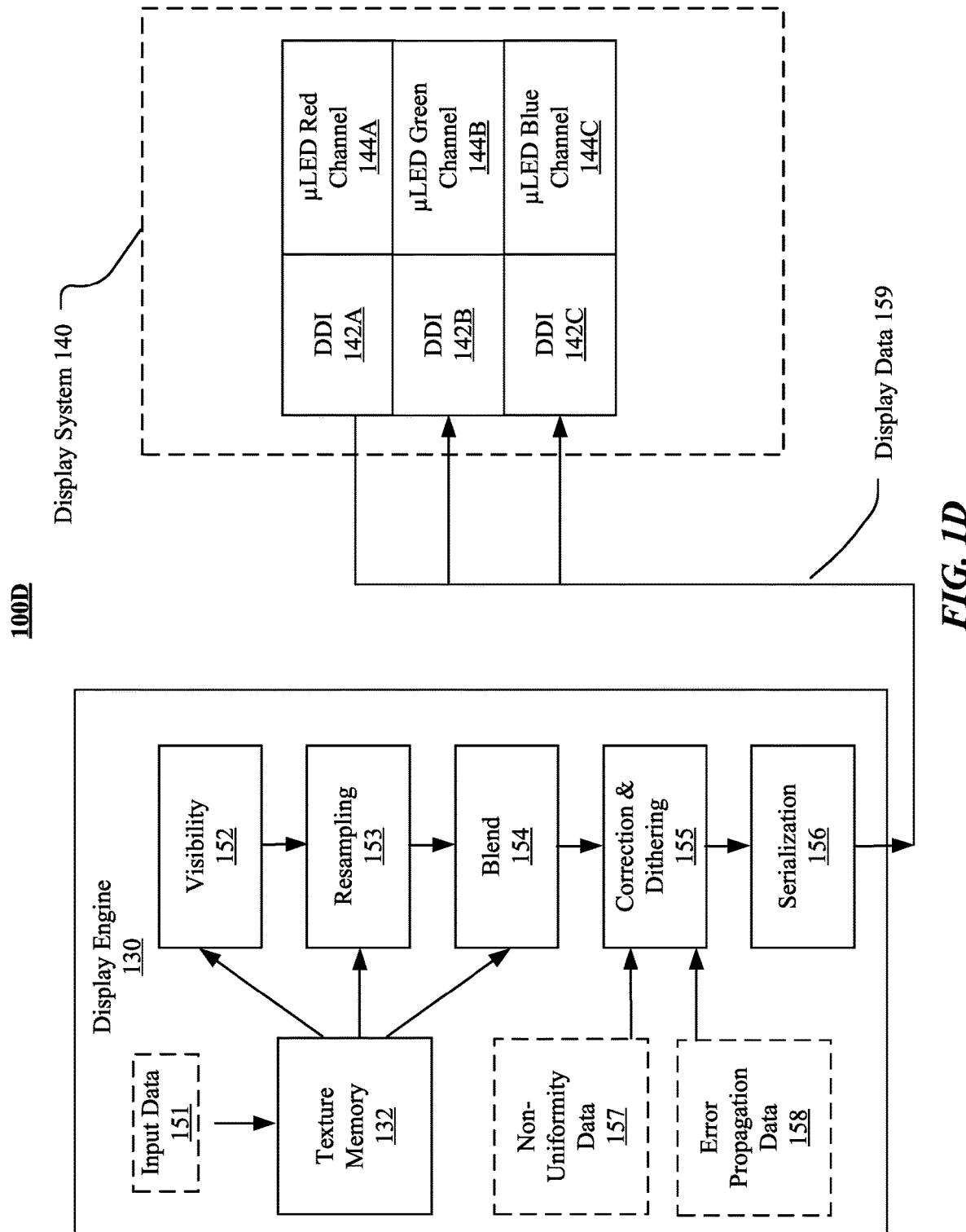
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current view position of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155 (e.g., based on the non-uniformity data 157 and error propagation data 158), a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
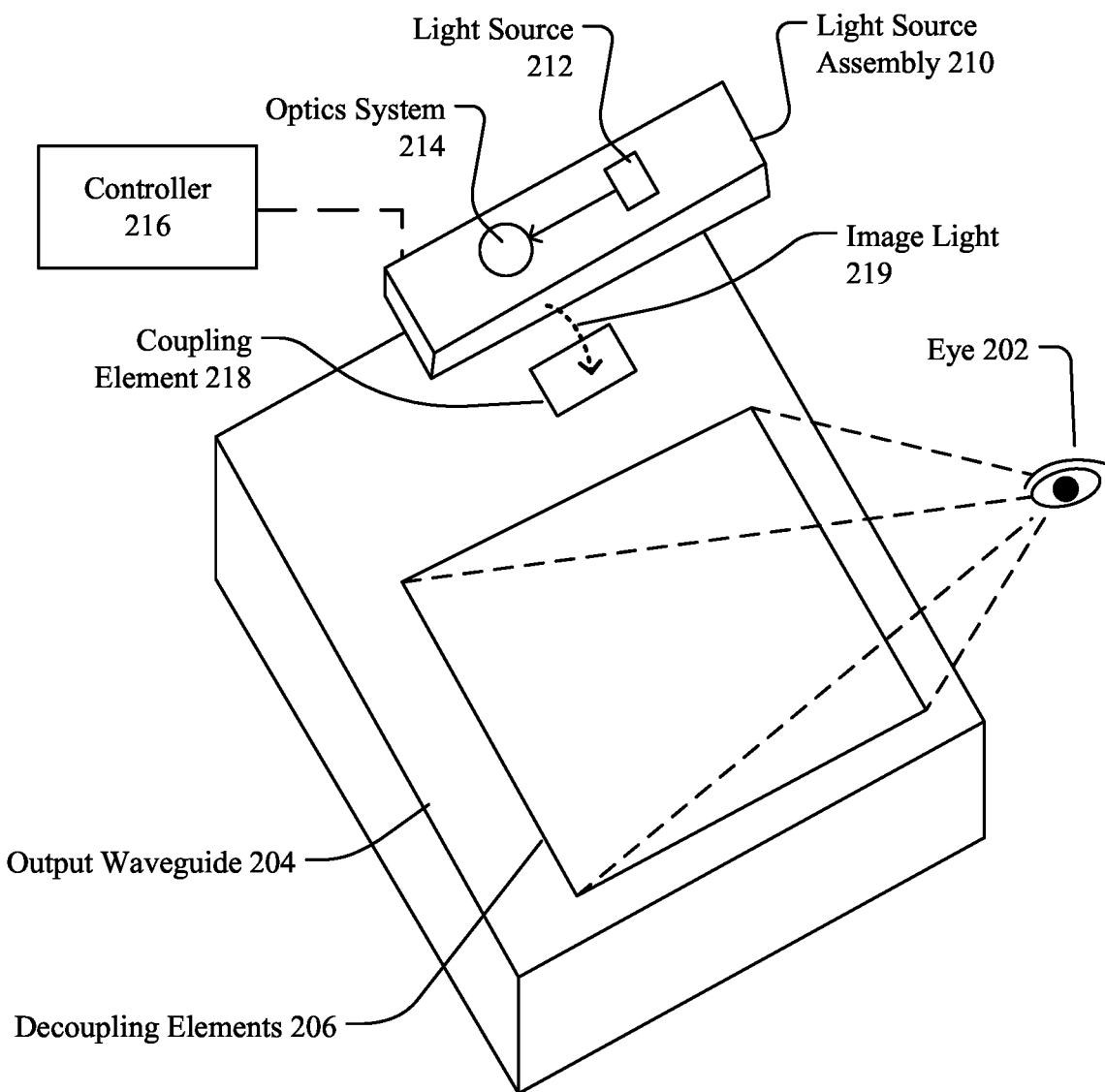
FIG. 2A illustrates an example scanning waveguide display.
Figure 3A:
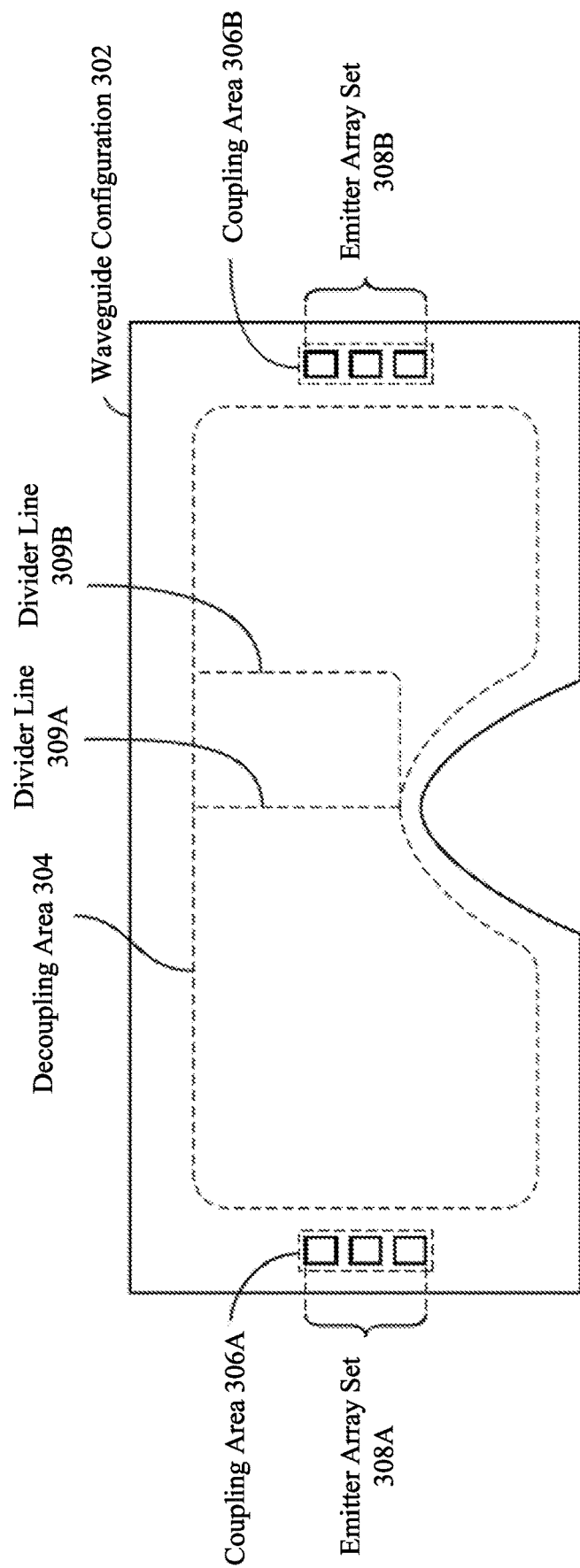
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 218 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
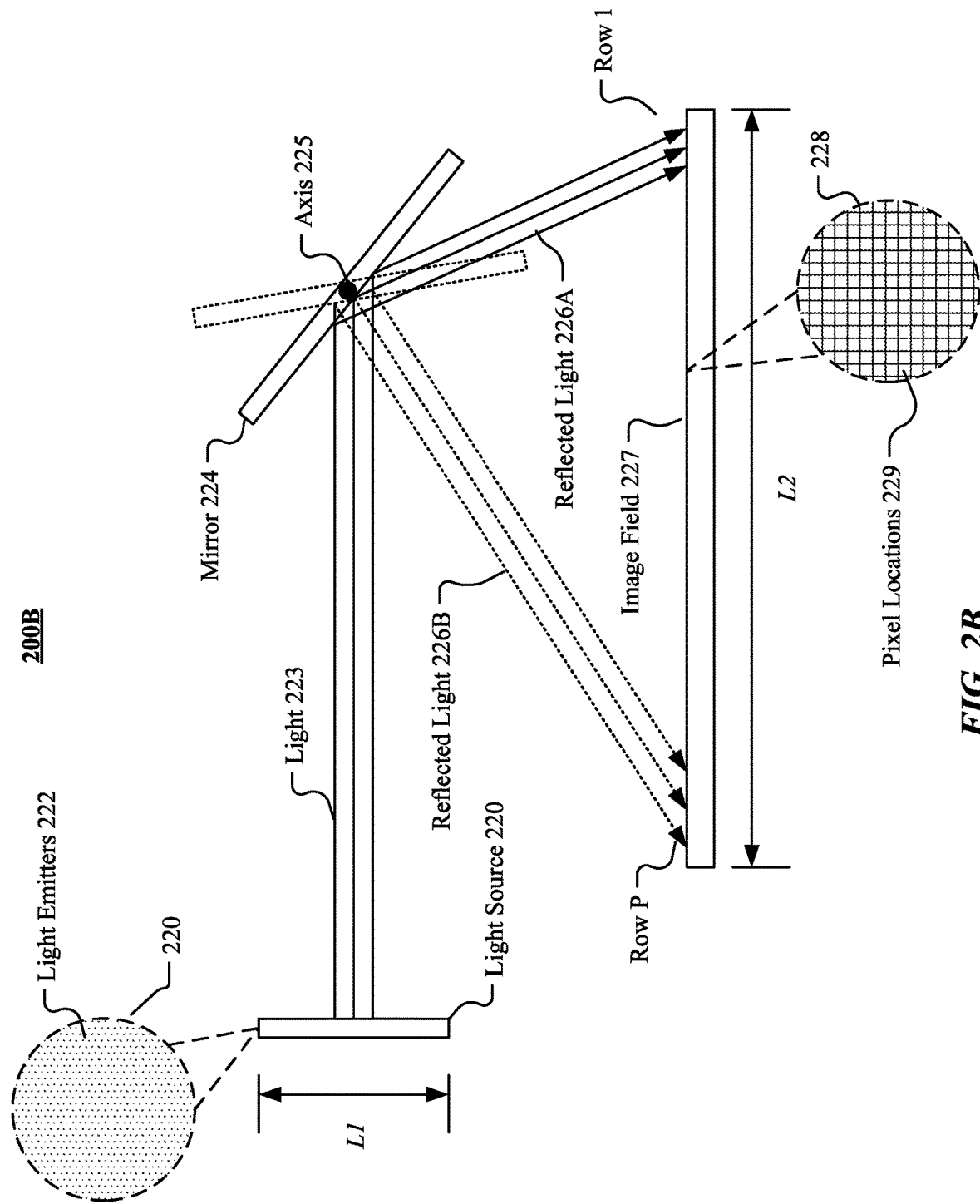
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiments, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
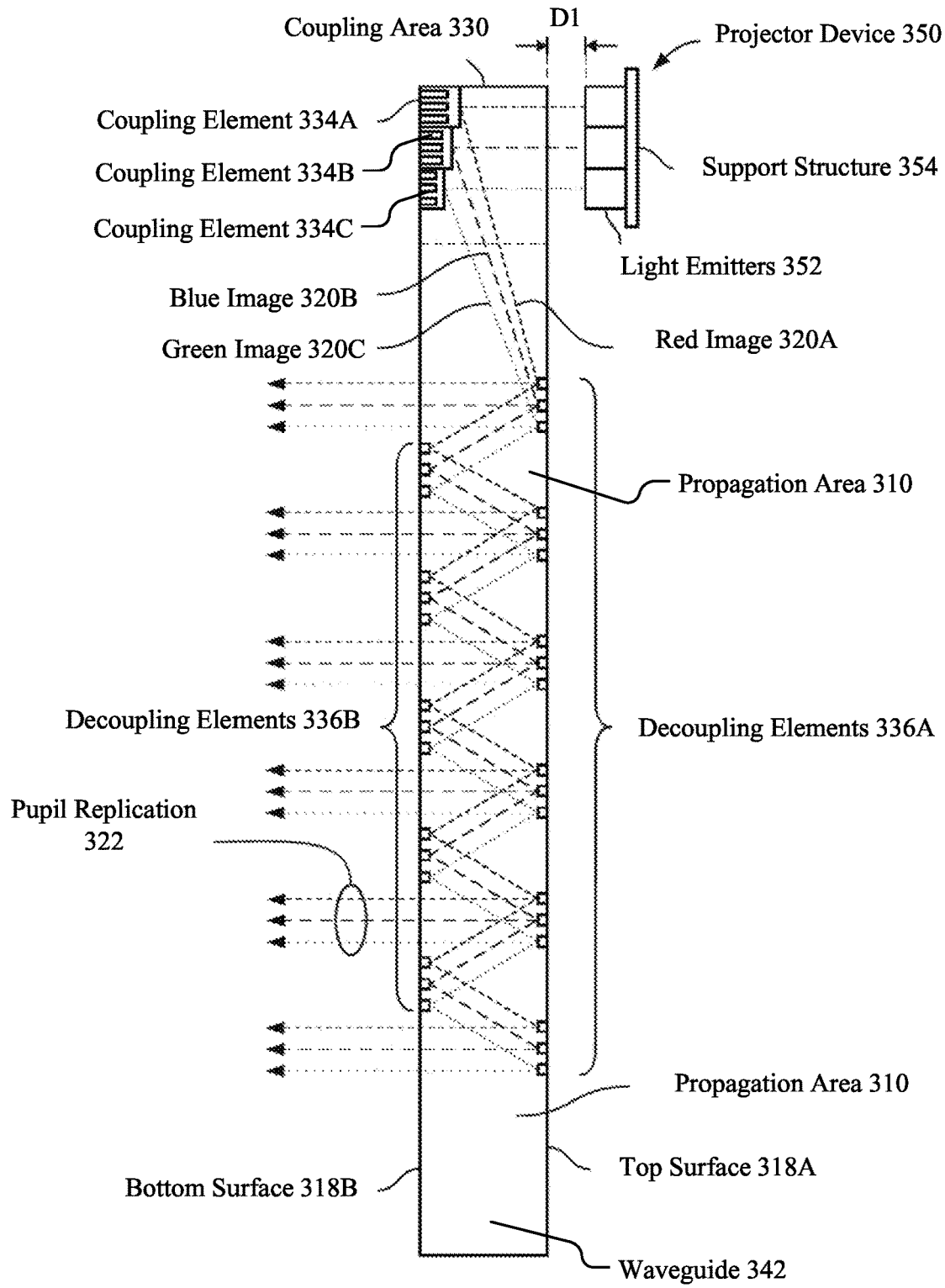
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 μm to approximately 500 μm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

AR/VR systems that use waveguide for pupil replication may face a waveguide non-uniformity problem. Ideally, light that exits waveguide along the same direction should have the same light intensity, regardless the locations where the light exits the waveguide. However, because of the waveguide non-uniformity, light exits the waveguide at different locations may actually have different light intensities. Furthermore, the display may have three color channels of RGB, and each color channel may be affected differently by the non-uniformity. When the relative intensities of the colors change, the display may have a color shift in addition to a brightness shift. As a result, when the user's eye moves, the displayed image may change its brightness and its colors according to the user's eye position (Z, Y, Z) in the 3D space. Thus, the system needs to calibrate the waveguide non-uniformity according to the actual eye position of the user. Previously existing technologies may assume that the eye distance Z does not change and only the (X, Y) position of the eye changes. This would result in non-optimal display results because the eye relief distance of the user's eye may actually change depending on how the user wear the headset and depending on who wears the headset (e.g., different users may have different head shapes and thus different eye distances to display). However, the eye tracking system used to determine the user's eye position may not be sufficiently accurate, which can lead to non-optimal calibration result. Furthermore, although it is possible to calibrate the user's eye positions on a 2D plane, calibrating the user's eye positions in the 3D space can be prohibitively expensive (e.g., too large amount of data to be stored) using previously existing technologies.

To solve these problems, in particular embodiments, the system may generate correction maps for correcting display non-uniformity according to the user's current eye positions. At a high level, the system may use an on-device calibration process to generate the correction maps for the user's eye relief distance. The on-device calibration process may be a two-step process or a one-step process. For the two-step process, the system may pre-generate and store a number of pre-generated correction maps in the memory storage. These pre-generated correction maps may be parameterized to the user's eye position (X, Y) at the user's eye relief distance. In particular embodiments, these pre-generated correction maps may be generated by actually measuring the corresponding waveguide transmission maps at multiple eye relief distances (e.g., at a number of pre-determined positions for each eye relief distance). Alternatively, these pre-generated correction maps may be generated by actually measuring the waveguide transmission maps at one eye relief distance and using ray optics to generate these pre-generated correction maps that are parameterized for pupil (X, Y) positions at the user's eye relief distance. At run time, the system may use the eye tracking system to determine the user's eye pupil position (X, Y, Z) and use the (X, Y) position (discarding the z information) to generate the final correction maps. The final correction maps may be generated by interpolating the corresponding pre-generated correction maps (e.g., four correction maps corresponding to four pre-determined positions containing the (X, Y) position). In particular embodiments, the system may use a one-step process to determine the final correction maps based on the (X, Y, Z) pupil position of the user. The system may use the ray optics to directly determine the final correction maps for the users based on the correction maps or/and transmission maps that are measured at one eye relief distance.

As an example, the system may first determine a rough eye relief distance Z using the eye tracking system of the AR/VR device and determine correction maps corresponding to the rough eye relief distance Z. Then, the system may allow the user to provide feedback information (e.g., using a sliding bar on the user interface, using a controller, using an voice input, etc.) to guide the system to generate an optimal correction map that would yield an optimal non-uniformity correction map that more accurately corrects for the display's non-uniformity. After that, the system may store the correction map and use the correction map to correct the waveguide non-uniformity at runtime. For example, the system may pre-determine a set of display correction maps at predetermined integral eye relief distances $Z_1$, $Z_2$, $Z_3$, etc. Then, during the calibration process, the system may determine a coarse estimation of the $Z_i$ distance of the user's eye relief distance and determine a set of correction maps for the $Z_i$ distance by interpolating pre-determined correction maps corresponding to the distance of $Z_n$ and $Z_{n+1}$ that encompass the estimated distance $Z_i$. Then, the system may use the set of correction maps at $Z_i$ distance to generate the final correction map, which is used to correct image being displayed. At the same time, the system may provide the user a virtual slider to allow the user to provide real-time feedback on the display quality. The system may constantly regenerate the correction map in real-time for the user based on the user feedback until the user sees an optimal display result.

In particular embodiments, the system may generate correction maps for correcting the display's non-uniformity using ray optics based on the light field rendering principle. For example, the system may use a propagation method to determine correction maps for correcting the display's non-uniformity according to the user's eye position based on pre-determined calibration data (e.g., transmission maps) at a particular eye relief distance (e.g., a nominal distance). The system may pre-measure the waveguide transmission maps at a number of pre-determined eye positions, which may be on a plane corresponding to a nominal eye relief. This pre-measurement may be done during the manufactory calibration process before shipping the product. The system may store these pre-measured transmission maps in a memory storage. At run time, the system may first determine the user's eye position in the 3D space including the eye relief distance. Then, the system may use the propagation method (e.g., a ray tracing method or ray optics method based on the light field rending principle) to determine a waveguide transmission map for the user's current eye position (X, Y, Z). The propagation method may include casting a number of rays from the user's eye position to a display plane of the waveguide. The system may determine the transmission map for the user's current eye position (X, Y, Z) by sampling the light field as represented by pre-measured transmission maps. Then, the system may generate the final correction map based on the transmission map for the user's current eye position (X, Y, Z).

By using correction maps to correct the display non-uniformity, particular embodiments of the system may provide better display quality and optimal user experience to the user. By generating the correction maps based on the pre-determined correction maps at a series of distances and the user's real-time feedback, particular embodiments of the system may generate effective correction maps for different eye relief distances based on approximate eye distances as determined by the eye tracking system. The system may provide an optimal display quality without increasing the demanding in the eye tracking system. By using the light field rendering to generate the correction maps, the system may further provide more efficient performance by reducing the usage of the computational resources and memory resources used to generate correction maps from pre-stored correction maps or transmission maps. In particular embodiments, the system may provide another advantage by using the light-field approach: it may reduce the number of positions that need to be measured in the factory or store calibration process. This can speed up calibration time and reduce required memory, etc. The system may use a smaller set of data to generate the intermediate correction maps, or in a real-time system, to directly compute the compensation for a given pupil (X, Y, Z) position.

In particular embodiments, the user's pupil-to-waveguide distance Z may be accurately measured during a fitment process (e.g., at the factory or store). Then, the waveguide transmission function may be measured for all (X, Y) positions at this distance Z, ensuring a match for the given user. For example, the system may an in-factory or in-store calibration process to generate a number of correction maps that are at the user's eye relief distance and are parameterized to the user's eye pupil position (x, y) at that eye relief distance. The system may use a high-resolution eye tracking or measuring system (e.g., at the headset factory or store) to determine an accurate eye relief distance (e.g., Z distance) between the user's pupil and the waveguide. Then, the system may generate a number of correction maps at a number of predefined (x, y) positions at the eye relief distance. Then, the system may store these correction maps in memory storage for later run-time use of generating correction maps based on the user's eye pupil position (x, y) as measured by the eye tracking system at run time. As discussed earlier, these pre-generated correction maps may be parameterized for the eye pupil position (x, y) at that eye relief distance. At run time, the system may determine the user's eye position of (x, y, z) and use the (x, y) position to calculate the final correction map (the z distance value will be disregarded because this embodiment assumes that the user's eye relief distance does not change during the usage of the device). The system may generate the final correction map by interpolating multiple pre-generated correction maps based on the (x, y) position of the user's pupil. This embodiment may generate accurate corrections map but could be relatively expensive since each user's eye relief distance need to be measured by in the factory or store. This embodiment may assume the user's eye relief will not change too much (e.g., with a threshold range) when using the AR/VR headset. This approach may provide high quality display results but it is likely to be a costly and lengthy process and may not able to scale to millions of units. Furthermore, a headset that is calibrated to a particular user may not fit well to another user because different users may have different head shapes and thus different eye distances/positions with respect to the head-amounted display. In particular embodiments, the system may use an online-calibration process to calibrate the user's eye distance and generate customed correction maps for that user. The system may determine the user's eye distance based on (1) eye tracking data of an eye tracking system, or/and (2) real-time feedback of the user (e.g., using a virtual slider to choose the Z distance that is the best perceptual match).

As an example for the fitment process and not by way of limitation, the system may use a high-resolution eye tracking or measuring system (e.g., at the headset factory or store) to determine an accurate eye relief distance (e.g., Z distance) between the user's pupil and the waveguide. Then, the system may measure the waveguide transmission maps for a number of predefined (X, Y) positions on the eye relief plane as viewed from the measured Z distance. The waveguide transmission map may characterize the transmission function or/and the transmission non-uniformity of the waveguide as viewed from the corresponding view position. Then, the system may generate the pre-generated correction maps based on the transmission maps. The system may store these correction maps in a memory storage for later use. At run time, the system may use an on-board eye tracking system to track the (X, Y) positions of the eye of the user and determine the corresponding custom correction map based on the current eye position of the user. For instance, the system may generate the custom correction map by interpolating the four pre-generated correction maps corresponding to four positions containing the (X, Y) position of the user's eye pupil. Because the Z distance of the user's eyes is accurately pre-measured, this embodiment may generate accurate corrections maps and provide optimal display quality. However, it could be relatively expensive since each user's eye relief distance need to be measured by in the fitment process in factory or store. This embodiment may assume the user's eye relief will not change after the user puts on the headset. However, in some situation, the user's eye relief distance to the display may change depending on how the user wears the headset. Also, the calibration results may be specific to particular user, which requires a new calibration process each time a new user wears the headset.

In particular embodiments, the system may allow the user to perform an online calibration process to determine, at run time, the Z distance of the user's eyes with respect to the display to derive an optimal display quality and generate correction maps to correct the display non-uniformity, accordingly. The system may generate pre-generated correction maps as a function of Z distance. For example, the system may generate a set of pre-generated correction maps (e.g., 9×7 positions) for each Z distance of a series of Z distances and store these pre-generated correction maps in memory storage for later use. In particular embodiments, the system may perform interpolation between two set of pre-generated correction maps at two Z distances ($Z_1$, $Z_2$) to determine a set of intermediate correction maps at a target eye relief distance $Z_i$. The target eye relief distance $Z_i$ may fall within the range of the two Z distances ($Z_1$, $Z_2$). Then, the system may generate custom correction maps by interpolating the intermediate correction maps based on the (X, Y) positions of the user's eye pupil. For example, the system may generate a custom correction map for a (X, Y) pupil position by interpolating four intermediate correction maps corresponding to four positions that contain the (X, Y) position at the target eye relief distance. The "custom correction maps" may also be referred to as "final correction maps," since they are the correction maps that are eventually used for correcting the displayed images.

In particular embodiments, the system may use a ray propagation method that can propagate groups of rays forward and backwards from a nominal Z plane to determine the custom correction maps based on the user's eye position. The ray propagation method may also be referred to as "ray optics methods" and may be based on the light field rendering principle. For example, the system may measure the transmission map of the display at the nominal eye relief (also referred to as the nominal eye distance or nominal eye relief distance to the display). The transmission map of the display may characterize the transmission non-uniformity of the display based on transmission function of the waveguides. Then, the system may use (1) direct interpolation between different sets of pre-generated correction maps at integral Z distances, or (2) a ray propagation principle to move back and force to different view positions to determine the custom correction maps for the user's eye positions at the current eye relief distance. The custom correction maps may be customized to the particular user (e.g., users may or may not wear glasses, users may have different head size and shapes, etc.) and particular type of headsets. Then, the system may load the headset with the set of correction maps at the nominal relief distance to correct the images to be displayed to the user. In particular embodiments, the pre-generated correction maps (either at one or multiple eye relief distances) may be determine once for a user, or per-session, or may be re-generated and updated at pre-determined time intervals or upon user's request.

In particular embodiments, the eye relief distance as measured by the on-device eye tracking system may be sufficiently accurate and the corresponding custom correction maps generated based on the estimated eye relief distance as measured by the on-device eye tracking system. In some situations, the initial estimation of the eye relief distance may not be accurate, which may result in less-optimal results in the custom correction maps and less optimal display quality. In particular embodiment, the system may allow the user to provide real-time feedback (e.g., through a virtual slider, a controller, or a voice input, etc.) to further adjust the estimated eye relief distance value. The system may constantly re-generate the custom corrections maps based on the user's feedback and update the displayed images as corrected by the newly generated custom correction maps until the user sees optimal display results. In particular embodiments, the system may not need to measure the eye relief distance using the on-device eye tracking system. Instead, the system may generate an initial correction map based on an initial eye relief estimation (e.g., based on a pre-set initial value, an average eye relief distance, an inferred eye relief distance, etc.). The system may generate an initial correction map based on the initial eye relief estimation and use the initial correction map to adjust the images being displayed to the user. Then, the system may directly allow the user to provide feedback (e.g., through a virtual slider, a controller, or a voice input) regarding the display quality. The user input may include the adjustment amount and adjust direction for the estimated eye relief distance. The system may constantly re-generate the custom correction maps and update the displayed image using the newly generated correction maps until the user sees an optimal display quality.

In particular embodiments, the AR/VR device may use an on-device calibration process to generate the custom correction maps based on the user's current eye position at current relief distance, using a two-step interpolation method. At a high level, the system may first generate and store in memory storage a matrix of pre-generated correction maps corresponding to a series of pre-determined Z distance during a manufactory calibration process. Each pre-determined Z distance of the series of Z distances may correspond to an array pre-generated correction maps corresponding to a number of pre-determined positions on that distance. At run time, the system may first determine a rough eye relief distance Z using the eye tracking system of the AR/VR device. Then, the system may select the two set of pre-generated correction maps corresponding to the two distances ($Z_1$, $Z_2$) that contain the target Z distance and generate a set of intermediate correction maps by interpolating the selected two set of pre-generated correction maps. After that, the system may use the eye tracking system to determine the (X, Y, Z) position of the user's eye pupil and use the (X, Y) position information (discarding the Z position information) to generate the custom correction maps by interpolating the corresponding intermediate corrected maps based on the user's eye pupil position (X, Y). For example, the system may generate a custom correction map for an eye position of (X, Y) by interpolating the four intermediate correction maps corresponding to the four pre-determined positions that contain the (X, Y) position. After that, the system may use the custom correction maps to correct the displayed images and allow the user to provide feedback information (e.g., using a sliding bar on the user interface, using a controller, using an voice input, etc.) to guide the system to generate an optimal correction map that would yield an optimal non-uniformity correction map that more accurately corrects for the display's non-uniformity. During the user feedback process, the system may repeat the above process to re-generate and re-apply the custom correction maps in real-time until the user sees an optimal display result. As a result, the custom correction maps may be constantly re-generated and updated based on the actual user's eye position.

Figure 4B:
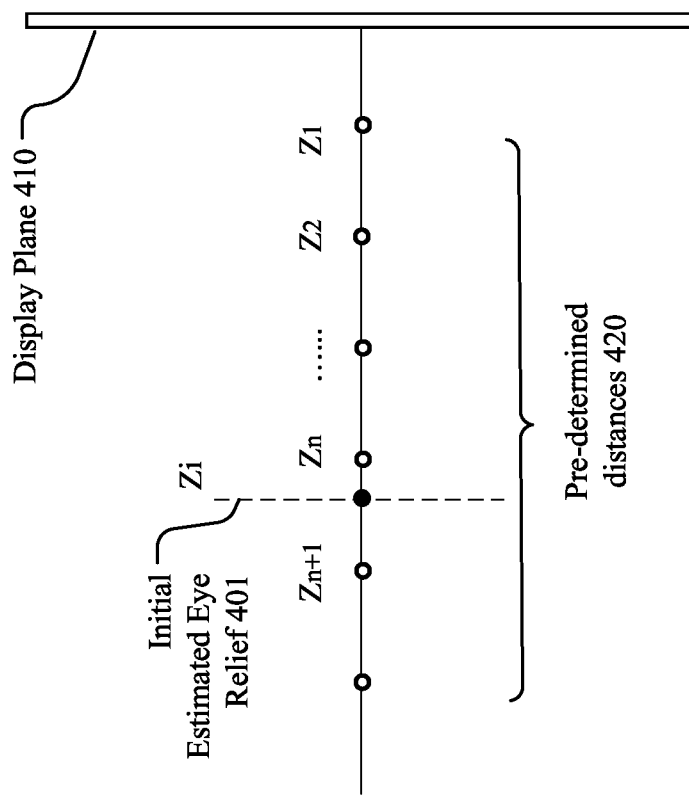
FIG. 4B illustrates an example process for determining a custom correction map based on the user's real-time feedback.
Figure 4A:
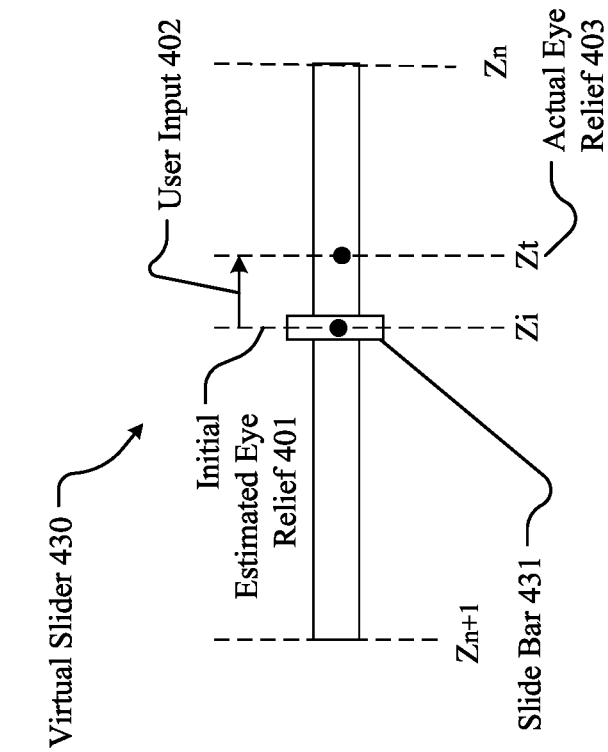
FIG. 4A illustrates an example process for generating custom correction maps based on an initial estimated eye relief.

FIG. 4A illustrates an example process 400A for generating custom correction maps based on an initial estimated eye relief 401. As an example and not by way of limitation, the system may pre-determine a matrix of pre-generated correction maps at the predetermined integral eye relief distances 420 (e.g., $Z_1$, $Z_2$, ... $Z_n$, $Z_{n+1}$, etc.). The matrix of pre-generated correction maps may include a set of pre-generated correction map at a number of pre-determined positions for each eye relief distances. Each pre-generated correction map may be generated based on the transmission non-uniformity of the display waveguides as viewed from the corresponding eye relief distance and corresponding eye position. The system may first measure the transmission characters (e.g., transmission functions) of the display waveguides as viewed from these pre-determined positions and generate the corresponding correction maps accordingly. Each pre-generated correction map may, once applied to the displayed image (e.g., adjusting the image pixels using the correction map values), correct the non-uniformity of the waveguides as viewed from the corresponding view position. The system may store these pre-generated correction maps in a memory storage and later use.

At run time and during the calibration process, the system may use the eye tracking system of the headset to determine a coarse estimation of the $Z_i$ distance corresponding to the user's eye relief distance. For instance, the system may determine an initial estimated eye relief 401 with the distance of $Z_i$ using the eye tracking system. Then, the system may compare the initial estimated eye relief 401 to positions corresponding to the set of pre-determined distance 420. The system may select the $Z_n$ and $Z_{n+1}$ based on a determination that the $Z_i$ falls within the range as determined by $Z_n$ and $Z_{n+1}$ and select the corresponding correction maps. In other words, the system may select the two sets of pre-generated correction maps at $Z_n$ and $Z_{n+1}$ from the memory storage based on the $Z_i$ distance as measured by the eye tracker, in response to a determination that $Z_i$ falls within the distance range of $Z_n$ and $Z_{n+1}$. Then, the system may interpolate these selected two sets of correction maps corresponding to $Z_n$ and $Z_{n+1}$ to determine a set of intermediate correction maps, which are parametrized for the (X, Y) pupil positions at the $Z_i$ distance. Then, the system may store this set of intermediate correction maps in the memory storage and use them to generate the custom correction maps based on the actual (X, Y) position of the user's eye pupil as measured by the eye tracking system at run time. For example a custom correction map for (X, Y) position may be determined based on interpolation of four intermediate correction maps corresponding to the positions (on the $Z_i$ distance plane) that contains the target (X, Y) position. The system may use the custom correction map to adjust the pixel values of the images to be displayed for correcting the display non-uniformity and display the corrected images to the user. The user may observe whether the correction map adequately corrected the displayed image for the display non-uniformities and provide feedback in real time for further adjustment.

FIG. 4B illustrates an example process 400B for determining a custom correction map based on the user's real-time feedback. After the system displayed the image that was adjusted based on the initial custom correction map as determined from the former steps, the system may display an interactive element to the user on the display or/and communicate with the user through other means to ask the user to provide feedback regarding the displayed images. For example, the system may display to the user a virtual slider 430 to allow the user to provide real-time feedback on the display quality. The two ends of the virtual slider 430 may correspond to the two distances $Z_n$ and $Z_{n+1}$ and the user may control the slide bar 431 of the virtual slider 430 to cause the system to try any position between $Z_n$ and $Z_{n+1}$. The system may specify a simulated $Z_j$ distance for the user would like to try (e.g., with the range between $Z_n$ and $Z_{n+1}$ as controlled by the slide bar). While the user is adjusting the virtual slider, the system may constantly regenerate the custom correction map in real-time for the user's eye position (X, Y) at the specified $Z_j$ distance, using the processes as described above. The system may constantly adjust the images to be displayed using the newly generated custom correction maps based on the user specified $Z_3$ distance and currently measured (X, Y) position of the user's eye pupil, and constantly update the display, until the user sees an optimal display result. The user input (e.g., 402) in each iteration may include an adjustment amount and an adjustment direction for the estimated eye relief 401. The system may determine the new estimation of the eye relief based on the adjustment amount and the adjustment direction as specified by the user. The user may move the slide bar 431 in any direction for any amount based on the real-time display quality of the displayed images. Because the initial estimated eye relief 401 (e.g., as determined by the on-device eye tracking system) may not be accurate in some situations, the initial custom correction map generated based on the initial estimated eye relief may not provide the optimal display quality. The system may use the user feedback in each iteration to determine a more accurate eye relief estimation and may reach the actual eye relief 403 after one or more iterations. The actual eye relief 403 as determined based on the user's real-time feedback. The system may generate the optimal custom correction map based on the actual eye relief 403 and load the optimal custom correction map to the headset to correct the display non-uniformity. The optimal correction map once applied to the images being displayed, may provide the most optimal display quality for the user.

FIG. 4C illustrates an example process 400C for determining a set of correction maps for an array of positions within the eye box. In particular embodiments, the process for generating the custom correction map may be repeated for each of the 9×7 eye box positions. In particular embodiments, the system may repeat this process only for a subset of positions of the 9×7 eye box positions. As an example and not by way of limitation, the system may pre-determine a set of correction maps (e.g., a 9×7 array of correction maps) for each plane at each pre-determined distance (e.g., planes at pre-determined distance 445). For instance, the system may determine a set of 9×7 correction maps for the eye box 440A and a set of 9×7 correction maps for the eye box 440C. Similarly, the system may determine the set of correction maps for an array of view positions on other planes at the pre-determined distances 445 to the display plane 410. The system may store this matrix of correction maps (e.g., N×9×7, wherein N is number of distances) in a memory storage. At run time, the system may first determine an initial estimated eye relief distance (e.g., using an eye tracking system, an average eye distance, an initial setup value, a random value). Then, the system may generate an initial correction map based on the initial estimated eye relief distance and use the initial correction map to correct the display non-uniformity for the displayed images. Then, the system may use the processes, methods, and principle as described in the earlier sections of this disclosure to determine an accurate eye relief distance 444 for the user's eye based on the user's real-time feedback through interacting with the virtual slider. During this process, the system may instruct the user to focus the gazing point at a reference point (e.g., the perpendicular line to the center of the display) to align the user's eye with a reference line or to be at a reference position. The system may generate a custom correction map based on the accurate eye relief distance 444 corresponding to the view position on the reference line 441.

The custom correction map generated based on the accurate eye relief distance 444 may provide the best display quality among all possible distances (along the reference line 441). However, the eye position of the user may not always be on the reference line 441 or be at a reference position because the user's eye may natural move around with the eye box when watching the displayed contents. When the user's eye is not on the reference line 441, the custom correction map generated for the view position on the refence line may not be the most optimal correction map. The custom correction map may be further improved to provide better display quality by considering the eye position within the plane at the accurate eye relief distance. The system may repeat the above described process to determine an array of correction maps for the array of pre-determined positions (e.g., 9×7 positions within the plane at the accurate eye relief distance 444). To generate each correction map of the array of 9×7 correction maps, the system may select two pre-determined correction maps at the same 2D positions on the respective planes at the distance of $Z_n$ and $Z_{n+1}$. For example, to generate a correction map for an eye position (e.g., a 2D position) within the eye box plane 445B, the system may interpolate a first correction corresponding to the same 2D position in the eye box plane 445A and a second correction map corresponding the same 2D position in the eye box plane 445C. By interpolating the correction maps corresponding to the eye box plane 445A (which is at the distance of $Z_{n+1}$) and the eye box plane 445C (which is at the distance of $Z_n$), the system may generate an array of 9×7 correction maps for the 9×7 eye positions with in the eye box plane 445B at the accurate eye relief distance 444. The system may load the array of 9×7 correction maps into the headset and store these correction maps in a memory storage for later use.

In particular embodiments, the on-device eye tracking system may be more accurate in determining the (X, Y) position of the eye within the plane at a determined eye relief distance (e.g., using the methods and processes as described above) than in determining the eye relief distance itself. Thus, the system may use the methods and process as described above to determine the accurate eye relief distance 444 (e.g., based on initial eye tracking data and the user's real-time feedback on the displayed quality) and generate the array of correction maps (e.g., 9×7 positions within the eye box plane 445B). Then, the system may determine, at run time, the (X, Y) position of the user eye using the eye tracking system within the eye box plane 445B. For example, the system may determine that the measured eye position 446B falls within an area enclosed by four view positions (e.g., 447 in FIG. 4C). The system may select the four correction maps corresponding to the four eye positions 447 and determine the optimal custom correction map by interpolating the four corrections maps (e.g., using bi-linear interpolations). As a result, the system may generate an optimal custom correction map for the actual eye position 446 considering both the Z distance (i.e., the eye relief distance) to the display and the (X, Y) position within the eye box plane 445B. The optimal custom correction may provide the most optimal display quality and user experience to the user. When the user's eye moves around within the eye box plane 445B, the system may constantly measure the (X, Y) position of the user's eye within the plane, re-generate the optimal custom correction map for the user's actual eye position, and update the displayed images as corrected using the newly generated optimal custom correction maps.

In particular embodiments, when the user's eye moves around within the eye box plane 445B, the user's eye position may fall between two pre-determined view positions of the eye box plane 445B. For example, the user's eye position may be between two pre-determined view positions and falls on the line connecting two adjacent per-determined view positions (e.g., vertically or horizontally). As another example, the user's eye may fall on the edge lines of the eye box (in contrast to falling in an area enclosed by four pre-determined view positions). In such scenarios, instead of selecting four correction maps corresponding to four pre-determined view positions, the system may select only two correction maps corresponding to the two pre-determined positions between which the eye position falls. The system may generate the custom correction map by interpolating the selected two correction maps. By generating the custom correction map based on two pre-determined correction maps rather than four, the system may reduce the computational amount needed for the rendering process while providing the optimal display quality to the user.

In particular embodiments, when the user's eye moves around within the eye box plane 445B, the user's eye may fall on a position that is close (e.g., within a threshold distance) to a pre-determined view position on the eye box plane 445B. For example, the user's eye position on the eye box plane 445B may be within a threshold distance to one of the corners of the eye box. As another example, the user's eye position on the eye box plane 445B may be within a threshold distance to one of the pre-determined view positions on the eye box plane 445B. In such scenarios, the system may measure the (X, Y) position of the user's eye within the plane and select a correction map from the array of correction maps to correct the images to be displayed, based on a determination that the selected correction map corresponds to a closest view position among the array of 9×7 view positions within the eye box plane 445B. In other words, the closest view position may be a pre-determined view position on the eye box plane 445B that is within a threshold distance to the measured (X, Y) position of the user's eye within the eye box plane 445B. By selecting the correction map corresponding to the closet view position, the system may save computational power in generating the optimal correction map while still providing optimal display quality, because when the user's eye position is close enough (e.g., within a threshold distance) to a single pre-determined view position, the correction map corresponding to that position may be sufficiently accurate to provide the optimal display experience.

In particular embodiments, the system may only calibrate a limited number of view positions within the eye box plane of the user. In other words, the system may only generate the correction maps for a limited number of view positions within the eye box plane. For example, the system may calibrate only the center position and four corner positions of the eye box. The system may interpolate the corresponding correction maps selected from the eye box planes 445A and 445C to generate the correction maps (based on the accurate eye relief distance 444) for the center view position of the eye box plane 445B and the four corners of the eye box plane 445B. The system may load these generated correction maps into the headset and store these generated correction maps into a memory storage. At run time, the system may use the eye tracking system to measure the (X, Y) position of the user's eye within the eye box plane 445B. Then, the system may generate a custom correction map based on the measured (X, Y) position of the user eye within the eye box plane 445B and the correction maps corresponding to the center point and four corners of the eye box plane 445B. For example, the system may generate the custom correction map for the user's eye by interpolating the correction maps corresponding to the center point and four corners of the eye box plane 445B, based on the measured (X, Y) position of the user eye within the eye box plane 445B. In particular embodiments, the system may use the accurate eye relief distance value to determine a 3D surface fit for the correction map. In particular embodiments, the subset of view positions within the eye box plane 445B that are calibrated may be selected based on the user's interpupillary distance (IPD, i.e., the distance between the pupils of the user's eyes), the maximum eye rotation, and the vertical bias due to slippage. In particular embodiments, this run time calibration process may be based on directly interpolating correction maps. In particular embodiments, this run time calibration process may be based on interpolating pre-determined transmission maps at the pre-determined distances instead of the correction maps.

In particular embodiments, the system may generate the optimal custom correction map by interpolating the pre-determined correction maps based on the user's feedback without using the on-device eye-tracking system. For example, the system may use a two-step manual calibration process to generate a custom correction map for the user based on the user's real-time feedback through one or more virtual sliders displayed to the user. The headset may be loaded with the same matrix of pre-determined correction maps in the memory (e.g., N×9×7 pre-determined correction maps). At run time, for the first step manual calibration process, the system may display a first virtual slider to the user to allow the user to setup and try out an initial eye relief distance value. The first virtual slider may have a control range for the eye relief distance value corresponding to a range as determined by the minimum eye relief distance value and the maximum eye relief distance value of the pre-determined correction maps. The user may control the slider bar of the first virtual slide to select any eye relief distance value that is supported by the headset and the pre-generated calibration data. Based on the user's input through the first virtual slider, the system may select two pre-determined view positions between which the user's selected view position falls. Then, the system may retrieve from the memory storage, the corresponding two correction maps associated with these two pre-determined view positions and generate the custom correction map by interpolating the two selected correction maps. During this process, the system may try out different correction maps corresponding to different pre-determined view distances to determine the estimated eye relief distance of the user. With the user's real-time feedback through the first virtual slider, the system may constantly re-generate the custom correction map to correct the displayed images and constantly update the displayed images as corrected by the newly generated correction maps, until the user sees an optimal display quality.

In particular embodiments, after the system determined that the interpolation of two pre-determined correction maps provides the best display quality to the user among all the combination of correction maps corresponding to adjacent view positions, the system may further display a second virtual slider to allow the user to further fine tune the estimated eye relief distance value based on the selected two adjacent view positions during the first step process. The second virtual slider may have a control range of the eye relief distance value corresponding to the two adjacent view positions. In other words, the second virtual slider may only allow the user to adjust the estimated eye relief distance within the eye relief distance range that has been determined during the first step. Based on the user's real-time inputs, the system may constantly re-generate the custom correction map and use the newly generated correction map to correct the images being displayed. The system may repeat this process until the user sees an optimal display quality regarding the displayed images. By using the two-step manual calibration process, the system may generate the custom correction map for the user's eye relief distance and provide optimal display quality to the user. In particular embodiments, the system may use a single virtual slider to determine the custom correction map based on the user's real-time input through the iteration process.

In particular embodiments, the system may display to the user a virtual slider that affects a forward or backward propagation of a compressed set of basis vectors (corresponding to waveguide maps from the nominal position) to determine the correction map for the user's current eye position. The propagation may be achieved by the interpolation across the basis vectors in the Z direction. The system may determine the principle factors and coefficients (e.g., in basis vectors) that can represent the pre-generated correction maps and perform interpolation on these factors and coefficients in the Z direction to determine the custom correction map for the user. Decompression may be performed by computing the linear reconstruction of the basis vectors. The system may first convert the waveguide maps (e.g., transmission maps or correction maps) in the RGB color space to the RCbCr color space and use the basis vectors including these factors and coefficients to represent the correction maps in a compressed form in the YCbCr color space. Then, the system may perform the interpolation on the basis vectors to determine the custom correction map and convert it back to the RGB color space. The system may re-generate the custom correction maps in real time and use the newly re-generated custom correction maps to adjust the images being displayed while the user is adjusting the virtual slider until the user sees an optimal display result. In particular embodiments, the process may be repeated for each of the 9×7 eye box positions or alternatively a subset positions may be selected to match to the user's IPD, the maximum eye rotation, or/and vertical bias due to slippage.

As an example and not by way of limitation, instead of interpolating the transmission maps or correction maps, the system may use basis functions (e.g., principle components, compression time update, set basis factors and coefficients) to represent the transmission maps or correction maps, and interpolate the basis functions, which is more efficient way to represent maps and to perform interpolation operations. The system may use the basis factors to represent waveguide maps (e.g., transmission maps or correction maps). The basis vectors may be linear and may be used to reconstruct waveguide maps. The factors and coefficients of the basis vectors may be interpolated because of their linearity. For each Z position, the system may set up the basis function and coefficients to represent the set of corresponding waveguide maps. The term "waveguide map" may refer to "waveguide transmission map" or "waveguide correction map." Then, the system may use the basis factors and coefficients for interpolation instead of operating on the waveguide maps directly. In particular embodiments, the waveguide maps may be in low spatial frequency. And, because of the low frequency spatial, the system may efficiently perform the YCbCr conversion and represent the maps in the YCbCr color space. After the interpolation is completed, the system may convert the interpolation results back to the RGB color space. By converting the RGB waveguide maps to the YCbCr maps, the system may perform the interpolation and store the data in YCbCr color space more efficiently. Thus, instead of using the RBG version waveguide maps, the system may use the YCbCr version waveguide maps to the efficiency purpose. The system may achieve a first compression ratio using the basis factors and achieve a second compression ratio on top of the first compression ratio due to the YCbCr representation. Instead of operating on the normal correction/transmission maps, the system may use the compression technique to make the process more efficient. In particular embodiments, the system may use any interrogatable compression process for generating the basis vectors.

As another example for waveguide correction map compression, the details of the systems, processes, methods, and principle for generating correction maps with compression are described in U.S. patent application Ser. No. 17,216,495 tiled "Waveguide Correction Map Compression," filed on Mar. 29, 2021, which is incorporated herein by reference. In particular embodiments, the system may correct the images to be displayed using correction maps that are generated based on: (1) the current eye position as determined using the eye tracking system; and (2) a temporal filter and previous correction maps used for correcting preceding frames. As an example and not by way of limitation, the details of the systems, processes, methods, and principle for generating correction maps based on the current eye position as determined using the eye tracking system and a temporal filter filtering the previously correction maps are described in U.S. patent application Ser. No. 16,917,025, tiled "Dynamic Uniformity Correction," filed on Jul. 01, 2020, which is incorporated herein by reference.

In particular embodiments, the system may generate custom correction maps for correcting the display's non-uniformity using light field rendering. For example, the system may use a propagation method to determine correction maps for correcting the display's non-uniformity according to the user's eye position (X, Y, Z) based on pre-determined calibration data (e.g., transmission maps) at a particular eye relief distance (e.g., a nominal distance). The system may pre-measure the waveguide transmission maps at a number of pre-determined eye positions, which may be on a plane corresponding to a nominal eye relief. This pre-measurement may be done during the manufactory calibration process before shipping the product. The system may store these pre-measured transmission maps in a memory storage. At run time, the system may first determine the user's eye position in the 3D space including the eye relief distance. Then, the system may use the propagation method (e.g., also referred to a ray tracing method or ray optics method based on light field rendering) to determine a waveguide transmission map for the user's current eye position.

In particular embodiments, the system may measure the transmission maps of the display waveguides at an array of view positions at a nominal distance to the display waveguide and store the pre-measured transmission maps in the memory storage. Each transmission may characterize the transmission characters of the display waveguide as viewed from the corresponding view position. The transmission characters may be associated with non-uniformity transmission characters of the display waveguides. For example, the transmission map may characterize the light intensity drops at each particular angle as viewed from the associated view position. Later at run time, the system may generate custom correction maps based on the stored transmission maps measured at the nominal distance (with no need to measure and store 3D measurement data over a number distances). The correction or adjustment to the displayed images may be per pixel and a correction may include a scaling factor for each pixels of an image to be displayed. Because the display waveguides may have different transmission characters in different color channels, the system may generate a correction map for each color channel of the image to be displayed and use the respective correction maps to adjust the pixel values of different color channels of the image separately.

Figure 5A:
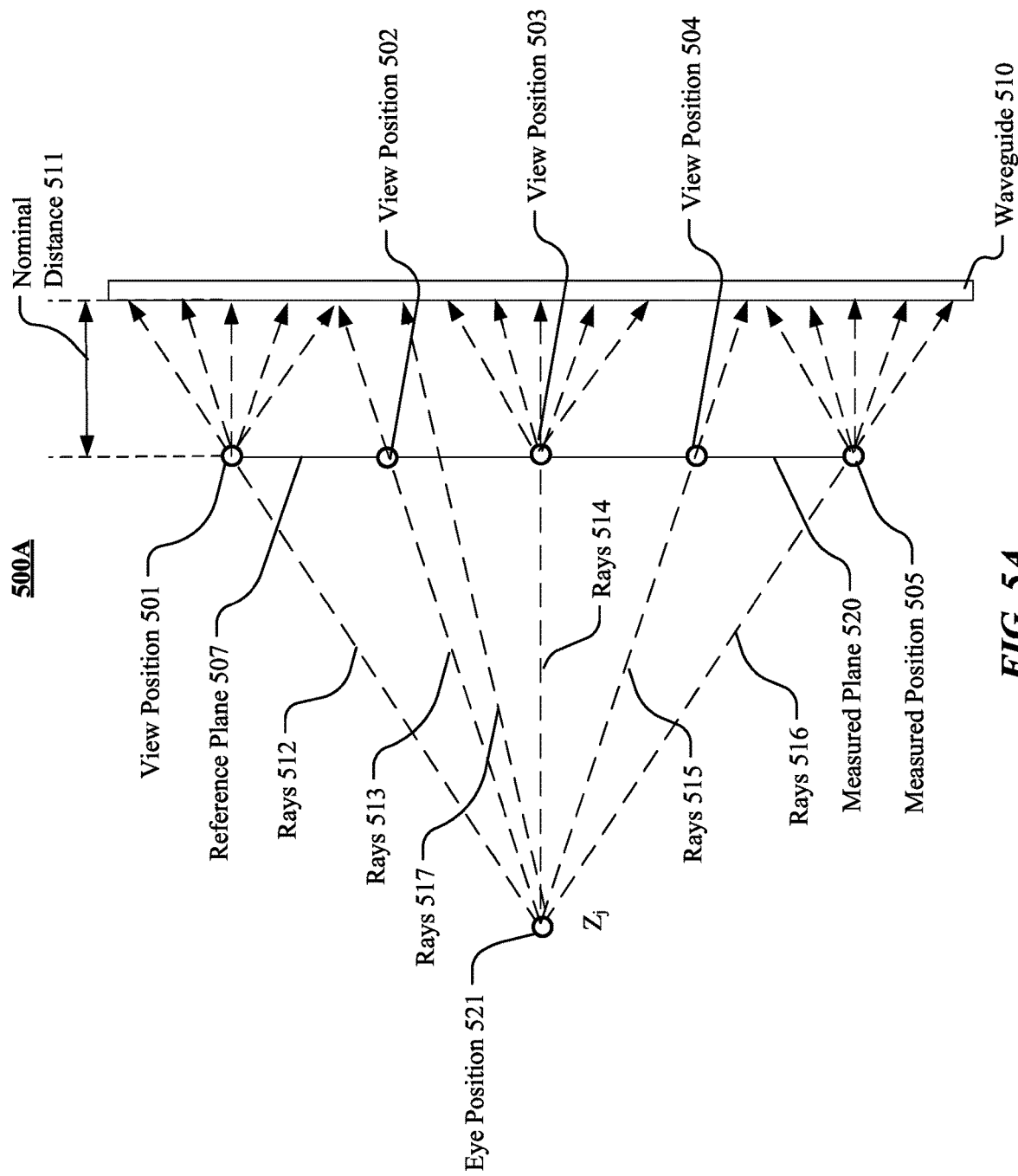
FIG. 5A illustrates an example process for generating correction maps using ray optics based on light field rendering principle.

FIG. 5A illustrates an example process 500A for generating correction maps using ray optics based on light field rendering principle. In particular embodiments, the system may use a propagation method to determine custom correction maps based on a number of pre-determined transmission maps measured at an array of view positions that are at a nominal eye relief distance from the display. As an example and not by way of limitation, as shown in FIG. 5A, the system may use a set of pre-measured transmission maps to determine the current transmission map (e.g., using the ray tracing method) for the user's current eye position 521. The set of pre-measured transmission map may correspond to an array view positions (e.g., 501, 502, 503, 504, 505, etc.) on the reference plane 507 at a nominal distance 511 to the display waveguide 510. Each transmission map may characterize the waveguide transmission characters as viewed from the corresponding view position. During a manufacture calibration process, the system may pre-measure the transmission maps of the waveguide at a number of pre-determined positions at a nominal eye relief distance 511. To determine the transmission map for the pre-determined view positions (e.g., 501, 502, 503, 504, 505), the system may cause the waveguide to emit light of known spectrum ranges with uniform luminance and measure the light luminance received at that particular view point to determine the transmission map the waveguides. As a result, the transmission maps determined based on such measurement may characterize the transmission non-uniformity of the waveguides (of different waveguide locations) as viewed from the respective view positions. The system may load the array of transmission maps into the headset and store these transmission maps in a memory storage for later use.

At run time, the system may use a propagation method to determine the transmission map and correction map for the user's current eye position 521 based on the stored transmission maps. In particular embodiments, the propagation method may include casting a number of rays (e.g., 512, 513, 514, 515, 516, etc.) from the user's eye position 521 to the display plane of the waveguide 510. Some rays may pass through the view positions (e.g., 512, 513, 514, 515, 516) that are used to capture the pre-captured transmission maps. Some rays (e.g., 517) may fall between a group of view positions (e.g., two, three, or four view positions) that are used to capture the pre-measured transmission maps. The system may determine the transmission map for the user's current eye position by sampling the light field as represented by pre-measured transmission maps. As an example and not by way of limitation, for a ray passing through a pre-determined view position (e.g., ray 512 passing through the view position 501), the corresponding light intensity (with the transmission characters and thus the display transmission non-uniformity characters) along that direction should be the same in the current transmission map (for the eye position 521) and the pre-measured transmission map corresponding to that view position (e.g., 501). In other words, the system may determine the light intensity (display transmission characters and thus the display transmission non-uniformity characters) along this ray direction of the ray 512 based on information (e.g., light intensity, display transmission characters, display transmission non-uniformity characters) of the same direction in the pre-captured transmission map corresponding the view position (e.g., 501) that the ray (e.g., 512) passes through.

Figure 5B:
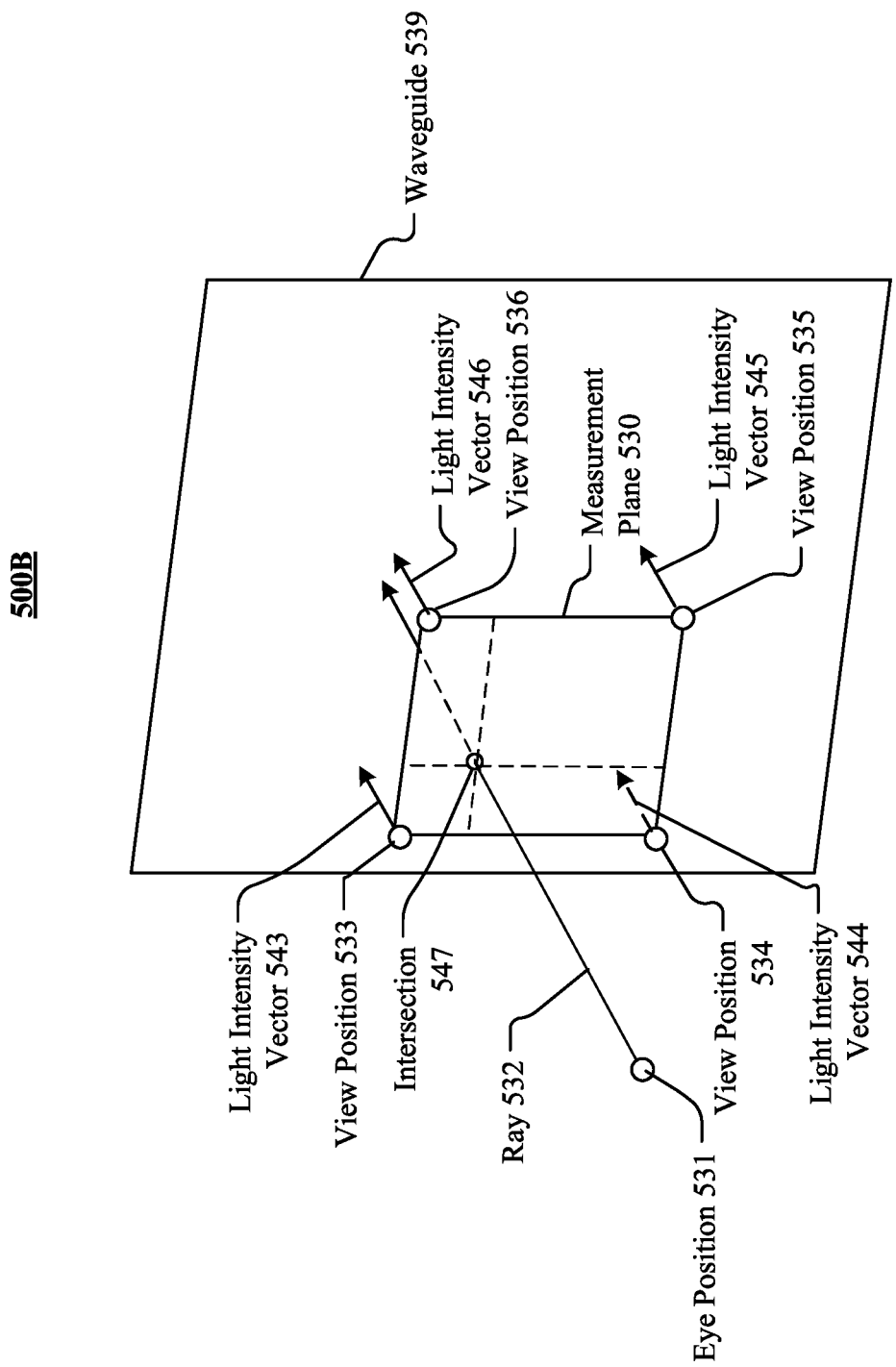
FIG. 5B illustrates an example process for using bi-linear interpolation to determine display transmission characters a long a casted ray falling between four pre-determined view positions.

FIG. 5B illustrates an example process 500B for using bi-linear interpolation to determine display transmission characters a long a casted ray falling between four pre-determined view positions. In particular embodiments, for a ray falling between four pre-determined view positions that are used to measure the pre-determined transmission maps, the system may use a bilinear interpolation process to determine the light intensity (including display transmission characters, display transmission non-uniformity characters) along that ray direction base on the four light intensities (including display transmission characters, display transmission non-uniformity characters) of the same direction as viewed from the four pre-determined view positions. As an example and not by way of limitation, as shown in FIG. 5B, the system may need to determine the correction map for the user's eye position 531. The system may access from the storage, the array of transmission maps that are measured from an array of view positions (e.g., 533, 534, 535, 536, etc.) on the measurement plane 530, which may be located at a nominal distance from a display plane of the waveguide 539. The system may cast or project a ray number of rays from the user's eye position 531 to the waveguide 539. Some of the casted rays may pass through the pre-determined view positions (e.g., the rays 512 and 513 pass through the view positions 501 and 502 in FIG. 5A, respectively). Some of the cased rays may fall in an area enclosed by four pre-determined view positions. For example, the intersection 547 of the ray 532 with the measurement plane may fall in an area enclosed by four pre-determined view positions of 533, 534, 535, and 536.

In particular embodiments, the system may determine four light intensity vectors 543, 544, 545, and 546 from the respective pre-determined view positions of 533, 534, 535, and 536 along the directions that are parallel to the direction of the ray 532. In other words, the light intensity vectors 543, 544, 545, and 546 may be parallel to the direction of the ray 532. Assuming a known light source (e.g., uniform light source of particular spectrum) or a known image is used for the measurement, the light intensity information may include the display transmission characters and the display transmission non-uniformity characters of the display (e.g., from the waveguide 539). The system may use a bi-linear interpolation process to determine the light intensity (and the display transmission characters, display transmission non-uniformity characters) based on the four light intensity vectors 543, 544, 545, and 546, which correspond to the four pre-determined view positions of 533, 534, 535, and 536. In other words, for each casted ray, the system may determine the transmission characters and transmission non-uniformity character along that ray direction based on the corresponding transmission characters and transmission non-uniformity characters along the same direction from four pre-determined transmission maps that are measured from respective four view positions enclosing the intersection of the casted ray with the measurement plane. As such, the system may determine a current transmission map for the current eye position 531 based on the four pre-measured transmission maps. The current transmission map may accurately describe the display transmission non-uniformity characters of the waveguide as viewed from the user's eye position 531. Then, the system may generate a correction map based on the current transmission map and use the correction map to compensate the pixel values of the image to be displayed before outputting these pixel values to the display. As a result, the display transmission non-uniformity may be effectively corrected, and the system may provide an optimal display quality to the user.

Figure 5C:
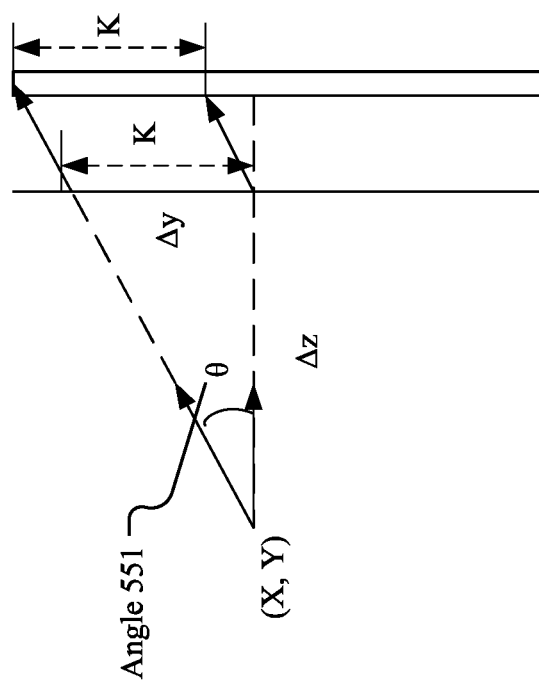
FIG. 5C illustrates an example process for relating the three coordinates X, Y, and Z.

FIG. 5C illustrates an example process 500C for relating the three coordinates X, Y, and Z. As an example and not by way limitation, the system may have a field of view corresponding to twice of the θ angle 551. Assuming the system has a specification for (X, Y) accuracy of pupil positions needed for correction at the nominal eye relief (e.g., given the (X, Y) accuracy specification in mm), the system may compute the change in eye relief that cause the same offset K at the waveguide using the following equation:

$$\Delta z = K/\tan(\theta) \tag{1}$$

To reconstruct the image (e.g., the transmission map) for Z off the measurement plane, the system may use data from many images (e.g., transmission maps). To render from a new eye relief distance, the system may propagate rays to the measurement plane from the eye position at the new eye relief distance. The ray angles as represented by (U, V) coordinates may be unchanged and the (X, Y) positions of the intersection of the casted rays may be correlated to the Z distance using Equation (1). Since the (U, V) coordinates are unchanging, the system may always have rays with the exact same angle (e.g. pixels at the same locations in the images). The (X, Y) intersections at measurement plane may lie between measurement locations on the measurement plane and may be used for the bilinear interpolation to determine the transmission characters and transmission non-uniformity characters along those ray directions.

As a result, the system may reduce the measurement time and data storage usage by representing display transmission non-uniformity over the pupil eye box volume while only measuring and storing data at one eye relief. The major run-time cost may be based on the number of rays traced. The system may use the light field rendering method and may capture, store, and transmit less data to simulate over a volume of pupil positions. For example, the (X, Y) scan at a single plane may be about 400 MB. At higher eye reliefs, the pixels may subtend larger areas on the waveguide and the system may capture closer to the waveguide and low-pass filtering before resampling at higher eye reliefs. For the measurement process, the system may register the tester (U, V) and (X, Y, Z) axes and may increase scan range to capture all needed rays. The system may measure at a closer distance to the waveguide to achieve a higher spatial resolution.

In particular embodiments, the system may first use an eye tracking system to determine a coarse estimation on the user's current eye relief distance. The eye tracking system may not be very accurate in determining the user's eye relief distance. The system may determine an estimated range for the user's current eye relief distance based on the accuracy and precision levels of the eye tracking system. The system may generate an initial custom correction map for adjusting the displayed images to correct the display non-uniformity and display images to the user as adjusted by the initial correction map. Then, the system may display a virtual slider or other interactive element to the user, to allow the user to provide real time feedback with regard to the quality of the displayed images as corrected by the correction map. The virtual slider may correspond to an adjustment range for the user's eye relief distance corresponding to the estimated range of the user's current relief distance as determined based on the eye tracking data. The user may interact with the virtual slider to indicate an adjustment amount and an adjustment direction for the user's current eye relief distance. The system may adjust the estimated eye relief distance of the user based on the real-time user input through the virtual slider. Based on the presumed user's (X, Y) eye position or based on the measured (X, Y) eye position of the user by the eye tracking system, the system may use the pre-measured transmission maps at the nominal distance Z to generate the synthesized transmission map for (X, Y, $Z_j$) for the user's current eye relief distance using light field rendering. The synthesized transmission map for the eye position (X, Y, $Z_j$) may be used to generate a correction map for the eye position (X, Y, $Z_j$), which in turn is used to correct the displayed images. The system may constantly generate new correction maps based on the adjusted estimated eye relief distance and use the newly generated correction maps to adjust the displayed images in real-time until the user sees an optimal display result. As a result, the display non-uniformity may be effectively corrected, and the system may only need to store the pre-measured data corresponding to a single eye relief distance. In particular embodiments, the system may assume the user's eye relief will not change and may only re-generate the correction map in response to the user's eye position change in the 2D plane. In particular embodiments, the system may assume the user's eye position may change in the 3D space (including eye relief) and may re-generate the correction map response to the user's eye position change in the 3D space.

In particular embodiments, the system may first determine an initial estimation for the user's eye relief distance to provide a starting point. The starting point for the user's eye relief distance may be a default distance value, an average distance value, an empirical value, etc. The system may generate an initial transmission map based on the initial eye relief distance using the propagation method as described above. Then, the system may generate an initial correction map based on the initial transmission map and use the initial correction map to adjust the displayed image. Because the initial estimation of the user's eye relief may not be very accurate, the display quality of the system using the initial correction map may be not optimal. In particular embodiments, the system may display to the user a virtual slider to allow the user to specify a candidate $Z_j$ distance for the user's eye (without using the eye tracking system). Based on the presumed (X, Y) position of the user's eye or based the measured (X, Y) position of the user eye using the eye tracking system, the system may use the pre-captured transmission maps at the nominal distance Z to generate the current transmission map for the eye position (X, Y, $Z_j$) using light field rendering. The synthesized transmission map for the eye position (X, Y, $Z_j$) may be used to generate a correction map for the eye position (X, Y, $Z_j$), which in turn is used to correct the displayed images. Then, the system may adjust the estimated eye relief distance of the user based on the user's real-time feedback and may constantly update the transmission map and correction map in real-time (e.g., for different Z distances and different (X, Y) eye positions, for different Z distances with the same (X, Y) eye position), until the user see an optimal display result. The system may repeat this process for each of the 9×7 eye box positions or may repeat this process only for a subset of eye box positions. As a result, the display non-uniformity may be effectively corrected, and the system may only need to store the pre-measured data corresponding to a single eye relief distance. In particular embodiments, the system may assume the user's eye relief will not change and may only re-generate the correction map in response to the user's eye position change in the 2D plane. In particular embodiments, the system may assume the user's eye position may change in the 3D space (including eye relief) and may re-generate the correction map response to the user's eye position change in the 3D space.

In particular embodiments, users may have varying eye reliefs and varying surfaces over which their pupil travels while gazing at the display. The system may generate non-uniformity correction maps that are specific to a user's eyeball position and shape. Because the user's pupil travels on a surface, the parameterization may be 2D and the system may determine a function of gaze angle or pupil (X, Y) coordinates for the real-time corrections. In particular embodiments, the system may only need data from one eye relief. The system may have different options for when to update transmission map and correction map used for correcting the displayed images (e.g., at purchase time of the headset during a fitment process, during an eye tracking calibration process, when device slips if that happens, etc.). In particular embodiments, the set of pre-measured transmission maps for a Z distance may be associated with a number of (X, Y) positions, similar to a light field. For example, there may be an array of 10×10 or 9×7 pre-measured transmission maps corresponding to an array of 10×10 or 9×7 (X, Y) locations.

In particular embodiments, the system may generate a set of correction maps for a fixed Z distance for each user, which is useful when there is significant uncertainty in measuring Z. The system may assume the user's eye relief will not change once the user put on the headset. In some other embodiments, the system may assume the user's eye position can change in the 3D space (including the eye relief distance). The system may use real-time eye tracking to determine the user's eye position in the 3D space (assuming the eye tracking system is capable of measuring the user's Z distance sufficiently accurately) and use the interpolation approach or the light field rendering to determine, for each frame, a current correction map based on the 3D eye position of the user. In other words, the system may not have an explicit calibration phase and may not need to generate a calibration that is specific to a certain eye relief distance. Instead, the system may work from the original data and for each frame, to compute a correction map for the current 3D eye position of the user. This embodiment may generate the most accurate correction map but may be relatively expensive in terms of computational and memory usage.

Figure 6:
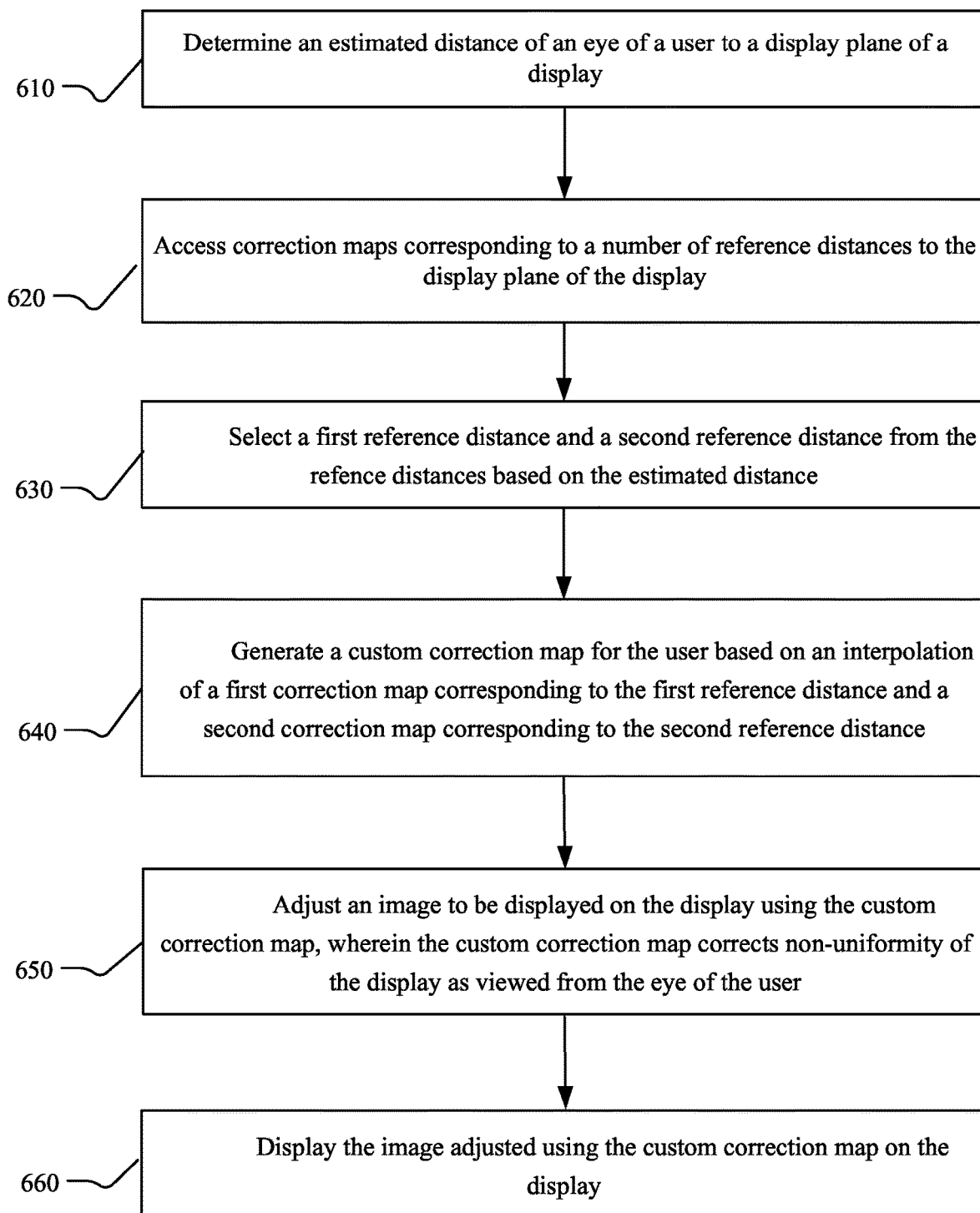
FIG. 6 illustrates an example method for using pre-determined correction maps to generate a custom correction map to correct the display non-uniformity.

FIG. 6 illustrates an example method 600 for using pre-determined correction maps to generate a custom correction map to correct the display non-uniformity. The method may begin at step 610, where a computing system may determine, based on an eye tracking system, an estimated distance of an eye of a user to a display plane of a display. At step 620, the system may access a number of correction maps corresponding to a number of reference distances to the display plane of the display. At step 630, the system may select a first reference distance and a second reference distance from the refence distances based on the estimated distance. At step 640, the system may generate a custom correction map for the user based on an interpolation of a first correction map corresponding to the first reference distance and a second correction map corresponding to the second reference distance. At step 650, the system may adjust an image to be displayed on the display using the custom correction map. The custom correction map may correct non-uniformity of the display as viewed from the eye of the user. At step 660, the system may display the image adjusted using the custom correction map on the display.

In particular embodiments, the first reference distance and the second reference distance may be selected based on determination that the estimated distance of the eye of the user to the display plane falls within a distance range as determined by the first reference distance and the second reference distance. In particular embodiments, the correction maps may be determined based on non-uniformity characters of the display as viewed from the reference distances. In particular embodiments, the system may display an interactive element on the display to the user. The system may receive a user input through an interaction of the user with the interactive element. The system may generate a subsequent custom correction map based on the first correction map, the second correction map, and the user input. The system may adjust the image to be displayed on the display using the subsequent custom correction map. The system may display the image adjusted using the subsequent custom correction map on the display.

In particular embodiments, the user input may include an adjustment amount and an adjustment direction for the estimated distance of the eye of the user to the display plane of the display. In particular embodiments, the system may determine a subsequent estimated distance of the eye of the user by adjusting the estimated distance using the adjustment amount and the adjustment direction. The subsequent custom correction map may be determined by interpolating the first correction map and the second correction map based on the subsequent estimated distance, the first reference distance, and the second reference distance. In particular embodiments, the system may determine a number of view positions on a plane at the subsequent estimated distance to the display plane of the display. The system may generate a correction map for each view position of the view positions. The correction map associated with a view position of the view positions may correct the non-uniformity of the display as viewed from that view position.

In particular embodiments, the system may determine a 2D position of the eye of the user on the plane at the subsequent estimated distance. The system may select four correction maps corresponding to four view positions based on a determination that the 2D position of the eye falls within an area enclosed by the four view positions. The system may determine an improved custom correction map for correcting non-uniformity of the display based on the selected four correction maps. In particular embodiments, the display may include one or more waveguides for coupling light into the eye of the user for light field rendering. In particular embodiments, the correction maps may be based on non-uniformity characters of the one or more waveguides for coupling light to the eye of the user at the reference distances.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for using pre-determined correction maps to generate a custom correction map to correct the display non-uniformity including the particular steps of the method of FIG. 6, this disclosure contemplates any suitable method for using pre-determined correction maps to generate a custom correction map to correct the display non-uniformity including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
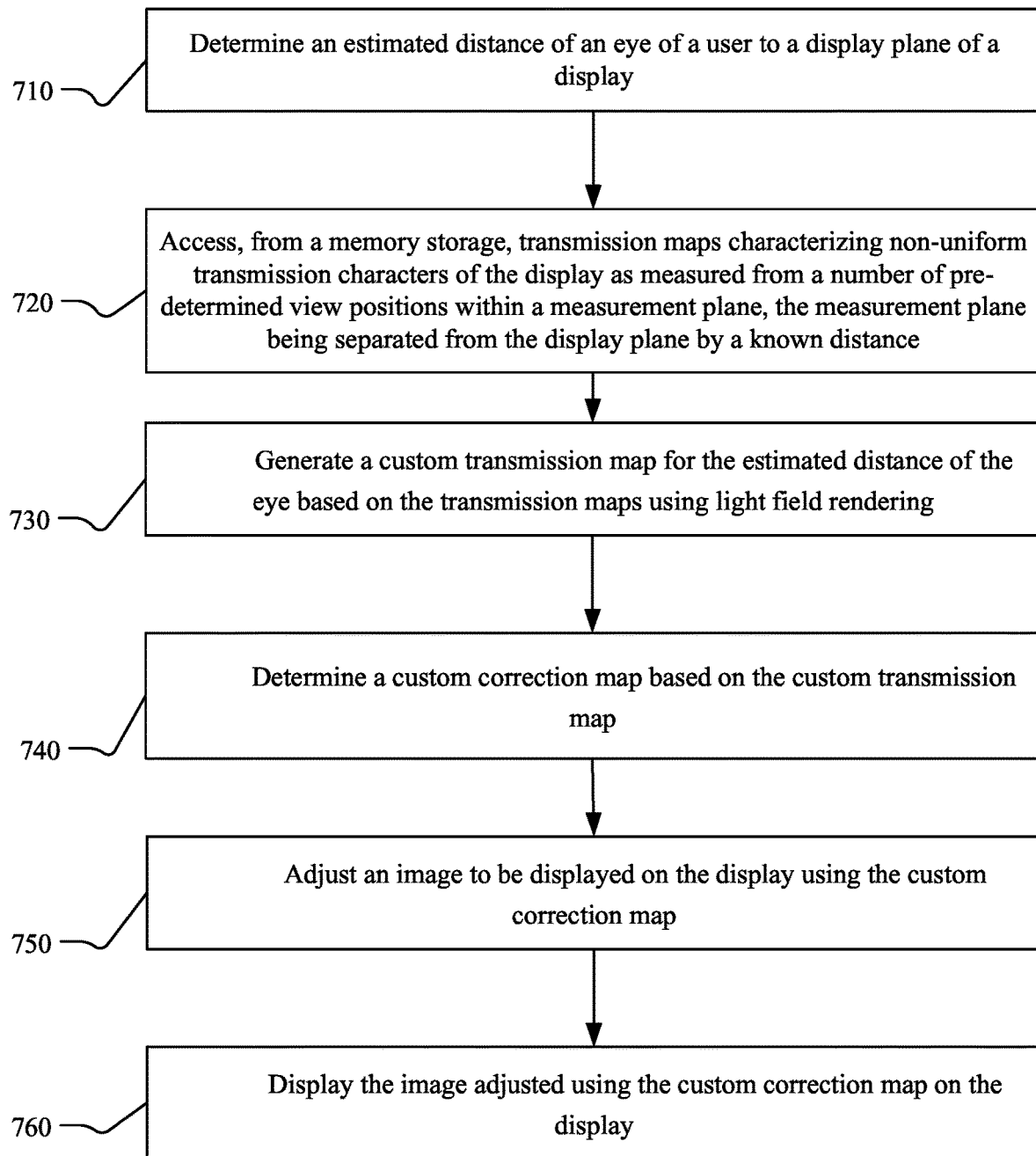
FIG. 7 illustrates an example method for using light field rendering to generate a custom correction map to correct the display non-uniformity.

FIG. 7 illustrates an example method 700 for using light field rendering to generate a custom correction map to correct the display non-uniformity. The method may begin at step 710, where a computing system may determine an estimated distance of an eye of a user to a display plane of a display. At step 720, the system may access, from a memory storage, a number of transmission maps characterizing non-uniform transmission characters of the display as measured from a number of pre-determined view positions within a measurement plane. The measurement plane may be separated from the display plane by a known distance. At step 730, the system may generate a custom transmission map for the estimated distance of the eye based on the transmission maps using light field rendering. At step 740, the system may determine a custom correction map based on the custom transmission map. At step 750, the system may adjust an image to be displayed on the display using the custom correction map. At 760, the system may display the image adjusted using the custom correction map on the display.

In particular embodiments, the estimated distance of the eye of the user may correspond to an estimated view position of the eye of the user. In particular embodiments, the non-uniform transmission character of the display along a direction as viewed from the estimated view position and characterized in the custom transmission map may be determined based on a corresponding non-uniform transmission character along that direction as viewed from a pre-determined view position of the pre-determined view positions as characterized in a corresponding transmission map of the transmission maps. In particular embodiments, the non-uniform transmission character of the display along a direction as viewed from the estimated view position and characterized in the custom transmission map may be determined based on four non-uniform transmission characters as viewed from four pre-determined view positions of the pre-determined view positions. The four non-uniform transmission characters may be captured in four transmission maps of the transmission maps. In particular embodiments, the custom transmission map of the display as viewed from the estimated view position may be determined based on a bilinear interpolation of the four transmission maps as measured from four pre-determined view positions.

In particular embodiments, the estimated distance of the eye of the user may be determined based on an eye tracking system. In particular embodiments, the estimated distance of the eye of the user may be determined based on a user input. In particular embodiments, the system may receive a user input regarding the displayed image. The system may generate a subsequent custom correction map based on the user input and the transmission maps. The system may adjust the image using the subsequent custom correction map. The system may display the image adjusted using the subsequent correction map on the display to the user. In particular embodiments, the user input may be received through an interaction of the user with an interactive element displayed to the user on the display. In particular embodiments, the interactive element displayed on the display to the user may be a virtual slider. In particular embodiments, the user input may include an adjustment distance and an adjustment direction for the estimated distance of the eye of the user to the display plane.

In particular embodiments, the subsequent custom correction map may correspond to a subsequent estimated distance of the eye of the user to the display plane. The subsequent estimated distance of the eye of the user to the display plane may be determined based on the adjustment distance, the adjustment direction, and the estimated distance of the eye of the user to the display plane. In particular embodiments, the user input may be received through an interaction of the user with the computing system through a controller or an audio input. In particular embodiments, the display may include one or more waveguides for coupling light into the eye of the user for light field rendering. In particular embodiments, the transmission maps may characterize non-uniform transmission characters of the one or more waveguides for coupling light to the eye of the user at different waveguide locations. In particular embodiments, the system may determine a number of correction maps based on the transmission maps. The system may convert these correction maps from a RGB color space to a RCbCr space. The system may determine a number of basis vectors representing the correction maps. Each basis vector may include one or more coefficients.

In particular embodiments, the system may determine a subsequent custom correction map by interpolating the basis vectors based on a subsequent eye distance of the eye of the user to the display plane. The system may convert the subsequent custom correction map from the RCbCr space to the RGB space. The system may adjust a subsequent image to be displayed on the display to the user using the subsequent custom correction map converted into the RGB space. In particular embodiments, the system may determine a number of custom correction maps for a number of view positions on a plane at the estimated distance to the display plane. The system may determine an improved custom correction map based on an estimated eye position, the eye positions, and the correction maps. The system may adjust the image using the improved custom correction map.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for using light field rendering to generate a custom correction map to correct the display non-uniformity including the particular steps of the method of FIG. 7, this disclosure contemplates any suitable method for using light field rendering to generate a custom correction map to correct the display non-uniformity including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
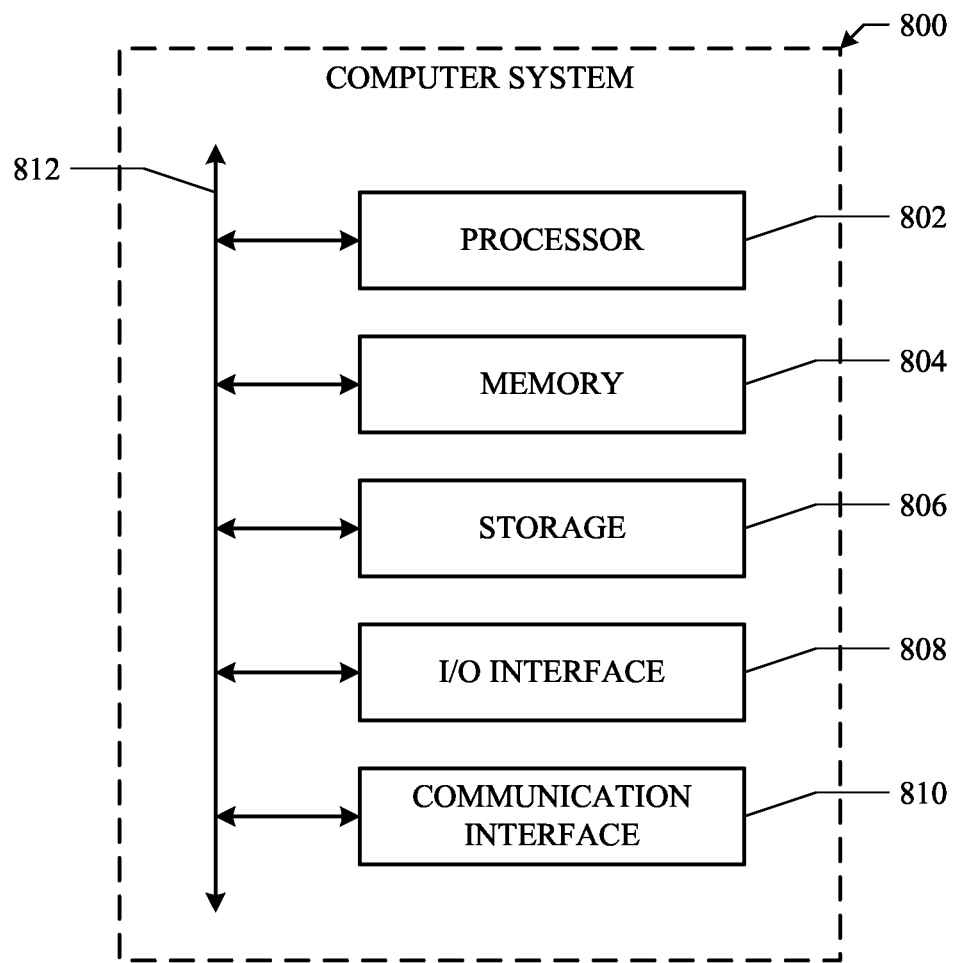
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining an estimated distance of an eye of a user to a display plane of a display;
    accessing, from a memory storage, a plurality of transmission maps characterizing non-uniform transmission characters of the display as measured from a plurality of pre-determined view positions within a measurement plane, the measurement plane being separated from the display plane by a known distance;
    generating a custom transmission map for the estimated distance of the eye based on the plurality of transmission maps using light field rendering;
    determining a custom correction map based on the custom transmission map;
    adjusting an image to be displayed on the display using the custom correction map; and
    displaying the image adjusted using the custom correction map on the display.

2. The method of claim 1, wherein the estimated distance of the eye of the user corresponds to an estimated view position of the eye of the user.

3. The method of claim 2, wherein a non-uniform transmission character of the display along a direction as viewed from the estimated view position and characterized in the custom transmission map is determined based on a corresponding non-uniform transmission character along that direction as viewed from a pre-determined view position of the plurality of pre-determined view positions as characterized in a corresponding transmission map of the plurality of transmission maps.

4. The method of claim 2, wherein a non-uniform transmission character of the display along a direction as viewed from the estimated view position and characterized in the custom transmission map is determined based on four non-uniform transmission characters as viewed from four pre-determined view positions of the plurality of pre-determined view positions, and wherein the four non-uniform transmission characters are captured in four transmission maps of the plurality of transmission maps.

5. The method of claim 4, wherein the custom transmission map of the display as viewed from the estimated view position is determined based on a bilinear interpolation of the four transmission maps as measured from the four pre-determined view positions.

6. The method of claim 1, wherein the estimated distance of the eye of the user to the display plane is determined based on an eye tracking system.

7. The method of claim 1, wherein the estimated distance of the eye of the user to the display plane is determined based on a user input.

8. The method of claim 1, further comprising:
receiving a user input regarding the displayed image;
generating a subsequent custom correction map based on the user input and the plurality of transmission maps;
adjusting the image using the subsequent custom correction map; and
displaying the image adjusted using the subsequent correction map on the display to the user.

9. The method of claim 8, wherein the user input is received through an interaction of the user with an interactive element displayed to the user on the display.

10. The method of claim 9, wherein the interactive element displayed on the display to the user is a virtual slider.

11. The method of claim 8, wherein the user input comprises an adjustment distance and an adjustment direction for the estimated distance of the eye of the user to the display plane.

12. The method of claim 11, wherein the subsequent custom correction map corresponds to a subsequent estimated distance of the eye of the user to the display plane, and wherein the subsequent estimated distance of the eye of the user to the display plane is determined based on the adjustment distance, the adjustment direction, and the estimated distance of the eye of the user to the display plane.

13. The method of claim 8, wherein the user input is received through an interaction of the user with the computing system through a controller or an audio input.

14. The method of claim 1, wherein the display comprises one or more waveguides for coupling light into the eye of the user for light field rendering.

15. The method of claim 14, wherein the plurality of transmission maps characterize non-uniform transmission characters of the one or more waveguides for coupling light to the eye of the user at different waveguide locations.

16. The method of claim 1, further comprising:
determining a plurality of correction maps based on the plurality of transmission maps;
converting the plurality of correction maps from a RGB color space to a RCbCr space; and
determining a plurality of basis vectors representing the plurality of correction maps, wherein each basis vector comprises one or more coefficients.

17. The method of claim 16, further comprising:
determining a subsequent custom correction map by interpolating the plurality of basis vectors based on a subsequent eye distance of the eye of the user to the display plane;
converting the subsequent custom correction map from the RCbCr space to the RGB space; and
adjusting a subsequent image to be displayed on the display to the user using the subsequent custom correction map converted into the RGB space.

18. The method of claim 1, further comprising:
determining a plurality of custom correction maps for a plurality of view positions on a plane at the estimated distance to the display plane;
determining an improved custom correction map based on an estimated view position, the plurality of view positions, and the plurality of correction maps; and
adjusting the image using the improved custom correction map.

19. One or more computer-readable non-transitory storage media embodying software that is operable when executed to:
determine an estimated distance of an eye of a user to a display plane of a display;
access, from a memory storage, a plurality of transmission maps characterizing non-uniform transmission characters of the display as measured from a plurality of pre-determined view positions within a measurement plane, the measurement plane being separated from the display plane by a known distance;
generate a custom transmission map for the estimated distance of the eye based on the plurality of transmission maps using light field rendering;
determine a custom correction map based on the custom transmission map;
adjust an image to be displayed on the display using the custom correction map; and
display the image adjusted using the custom correction map on the display.

20. A system comprising:
one or more non-transitory computer-readable storage media embodying instructions; and
one or more processors coupled to the storage media and operable to execute the instructions to:
determine an estimated distance of an eye of a user to a display plane of a display;
access, from a memory storage, a plurality of transmission maps characterizing non-uniform transmission characters of the display as measured from a plurality of pre-determined view positions within a measurement plane, the measurement plane being separated from the display plane by a known distance;
generate a custom transmission map for the estimated distance of the eye based on the plurality of transmission maps using light field rendering;
determine a custom correction map based on the custom transmission map;
adjust an image to be displayed on the display using the custom correction map; and
display the image adjusted using the custom correction map on the display.

* * * * *